(12) United States Patent
Kato et al.

(10) Patent No.: US 7,669,943 B2
(45) Date of Patent: Mar. 2, 2010

(54) VEHICLE MOTION CONTROL DEVICE

(75) Inventors: Toshihisa Kato, Handa (JP); Junya Nagaya, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 0 days.

(21) Appl. No.: 10/888,014

(22) Filed: Jul. 12, 2004

(65) Prior Publication Data

US 2005/0012392 A1 Jan. 20, 2005

(30) Foreign Application Priority Data

Jul. 17, 2003 (JP) .............................. 2003-275937

(51) Int. Cl.
*B60T 8/60* (2006.01)
*B60G 17/016* (2006.01)
(52) U.S. Cl. ..................... 303/146; 303/191; 701/83; 180/282
(58) Field of Classification Search .......... 303/146, 303/191, 149; 701/82–84, 89, 70; 280/5.51, 280/5.502; 180/282
See application file for complete search history.

(56) References Cited

U.S. PATENT DOCUMENTS

| | | | |
|---|---|---|---|
| 4,957,308 A | | 9/1990 | Takizawa |
| 5,700,073 A | * | 12/1997 | Hiwatashi et al. ............ 303/146 |
| 5,869,943 A | * | 2/1999 | Nakashima et al. .......... 318/586 |
| 6,086,168 A | | 7/2000 | Rump |
| 6,139,120 A | * | 10/2000 | Fukada ....................... 303/146 |
| 6,280,003 B1 | * | 8/2001 | Oshiro et al. ............... 303/9.62 |
| 6,304,805 B1 | * | 10/2001 | Onogi ........................ 701/36 |

(Continued)

FOREIGN PATENT DOCUMENTS

DE 39 24 717 A1 2/1990

(Continued)

OTHER PUBLICATIONS

Machine translation of JP-200147989.*

(Continued)

*Primary Examiner*—Melody M Burch
(74) *Attorney, Agent, or Firm*—Buchanan Ingersoll & Rooney PC

(57) ABSTRACT

In the roll-over preventing control, a vehicle motion control device 10 causes inner-wheel braking force, according to the absolute value of an actual lateral acceleration Gy, only on the rear wheel at the inner side of the turning direction when the absolute value |Gy| of the actual lateral acceleration is not less than a rear-wheel-side reference value Gyr and not more than a front-wheel-side reference value Gyf thereby causing height lowering force at the vehicle rear-side section of the inner side of the turning direction. In addition, when the absolute value |Gy| of the actual lateral acceleration becomes not less than the front-wheel-side reference value Gyf, the inner-wheel braking force according to the absolute value |Gy| of the actual lateral acceleration is kept to be caused on the rear wheel at the inner side of the turning direction and outer-wheel braking force according to the absolute value |Gy| of the actual lateral acceleration is also caused on the front wheel at the outer side of the turning direction, thereby forcibly generating a yawing moment on the vehicle in the direction opposite to the turning direction.

17 Claims, 10 Drawing Sheets

U.S. PATENT DOCUMENTS

| | | | |
|---|---|---|---|
| 6,694,225 B2 * | 2/2004 | Aga et al. | 701/1 |
| 6,843,538 B1 * | 1/2005 | Nagae et al. | 303/146 |
| 6,910,746 B2 * | 6/2005 | Kato et al. | 303/140 |
| 2007/0112498 A1 * | 5/2007 | Yasutake et al. | 701/72 |

FOREIGN PATENT DOCUMENTS

| | | |
|---|---|---|
| DE | 197 46 889 A1 | 5/1998 |
| DE | 199 36 423 A1 | 2/2000 |
| JP | 8-183436 A | 7/1996 |
| JP | 10-81215 | 3/1998 |
| JP | 2001-47989 A | 2/2001 |
| JP | 200466938 A * | 3/2004 |
| WO | 03/101 784 A1 | 12/2003 |
| WO | WO-2004012972 A1 * | 2/2004 |

OTHER PUBLICATIONS

Japanese Official Action dated Apr. 1, 2008 with English Language Translation.

Official Action issued in corresponding DE 10 2004 034 399.3-21, Apr. 7, 2008, German Patent & Trademark Office, Germany; and English-language translation thereof.

* cited by examiner

FIG.3
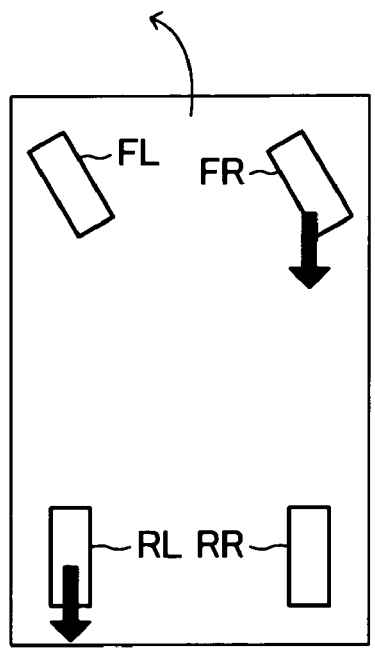
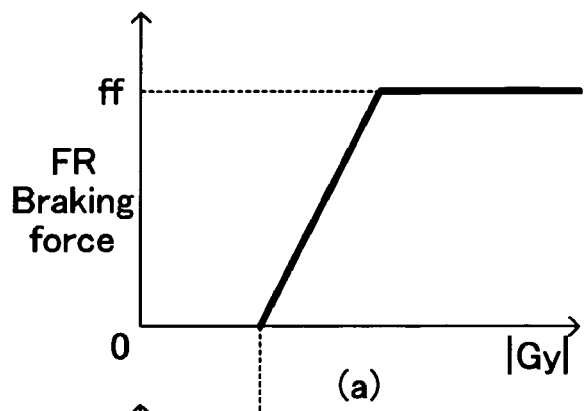
(a)
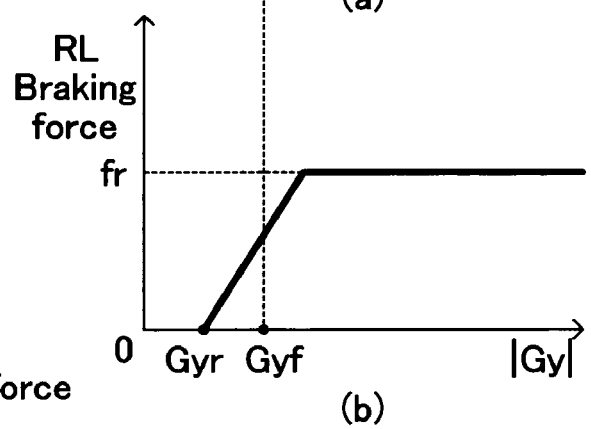
(b)
Actual lateral acceleration
➡ : Direction of braking force
→ : Turning direction of vehicle

VEHICLE MOTION CONTROL DEVICE

BACKGROUND OF THE INVENTION

1. Field of the Invention

The present invention relates to a vehicle motion control device for controlling a motion of a vehicle by controlling braking force exerted on each wheel of the vehicle.

2. Description of the Prior Arts

There has conventionally been a demand for controlling a vehicle motion so as to prevent the turning state of the vehicle from being unstable due to the occurrence of an excessive roll angle on the vehicle, when the vehicle is in the turning state. This roll angle depends generally upon the magnitude of an actual lateral acceleration (accordingly, the centrifugal force exerted on the vehicle) that is a component of an acceleration actually exerted on the vehicle in the side-to-side direction of the vehicle body, and increases with the increase of the actual lateral acceleration. On the other hand, the magnitude of the actual lateral acceleration exerted on the vehicle is decreased by producing a yawing moment in the direction opposite to the turning direction of the vehicle or by decelerating the vehicle.

From the above, a vehicle motion control device disclosed in the patent document 1 executes a control for exerting predetermined braking force on the outer wheel in the turning direction of the vehicle when the actual lateral acceleration (its absolute value) exceeds a predetermined roll-over preventing threshold value with the vehicle brought into a turning state. According to this device, a yawing moment is given to the vehicle in the direction opposite to the turning direction of the vehicle due to the predetermined braking force, whereby the magnitude of the actual lateral acceleration exerted on the vehicle is decreased, thereby being capable of preventing the occurrence of the excessive roll angle on the vehicle.

[Patent Document 1]

Japanese Unexamined Patent Application No. HEI 10-81215

However, when the braking force is exerted on the outer wheel of the turning direction according to the above-mentioned device, a yawing moment is caused on the vehicle in the direction opposite to the turning direction of the vehicle, so that the turning state of the vehicle is controlled to be brought into an understeer state. Consequently, the turning radius of the vehicle becomes greater than the expected turning radius, thereby entailing a problem that there may be a case where a tracing performance cannot satisfactorily be maintained.

SUMMARY OF THE INVENTION

The present invention is accomplished to solve this problem, and aims to provide a vehicle motion control device that can suitably prevent an occurrence of an excessive roll angle on a vehicle body while satisfactorily maintaining a tracing performance.

A vehicle motion control device according to the present invention has index obtaining means for obtaining an excessive roll angle occurrence tendency index value that indicates a degree of tendency that an excessive roll angle occurs on the vehicle and inner-wheel braking force controlling means that exerts inner-wheel braking force for generating force, that is for decreasing a height of a vehicle body at the section above the inner wheel of the turning direction, on the wheel at the inner side of the turning direction, when the vehicle is in the turning state and the degree of tendency that the excessive roll angle occurs, that is indicated by the obtained excessive roll angle occurrence tendency index value, becomes equal to or greater than a first predetermined degree.

Here, the excessive roll angle occurrence tendency index value is, for example, any one of a lateral acceleration that is a component of an acceleration exerted on the vehicle in the side-to-side direction of the vehicle body, a yaw rate exerted on the vehicle, a roll angle caused on the vehicle, a roll angle speed that is a rate of change with time of the roll angle, an operation amount of a steering that changes a turning angle of a steering wheel of the vehicle and an operation speed of the steering, or a value based upon at least these factors, but it is not limited thereto.

In general, when the vehicle is in the turning state, a load exerted on the wheel at the outer side of the turning direction increases due to the action of centrifugal force exerted on the vehicle, while a load exerted on the wheel at the inner side of the turning direction decreases. As a result, owing to a function of a suspension of each wheel, the height of the vehicle body at the outer side of the turning direction is decreased and the height of the vehicle body at the inner side of the turning direction is increased, compared to the case where the vehicle is going straight, so that a rolling occurs on the vehicle. In other words, the roll angle of the vehicle increases both by that the height of the vehicle body at the outer side of the turning direction is decreased and that the height of the vehicle body at the inner side of the turning direction is increased.

On the other hand, when braking force is exerted on a wheel (in case where the vehicle is running forward), it is known that force (hereinafter referred to as "height lowering force" for lowering the height of the vehicle body at the section above the wheel is generated, regardless of the change of the load exerted on the wheel. This is based upon the factor that the suspension of each wheel is generally configured such that an instantaneous center at the vehicle body side during the relative movement of the wheel to the vehicle body is positioned above the center of the wheel and ahead of the center of the wheel in the longitudinal direction of the vehicle body.

Specifically, when braking force is given to the wheel, braking force is exerted on the instantaneous center positioned at the vehicle body side (accordingly, on the vehicle body itself), and further, a moment around the instantaneous center is exerted on the wheel. The positional relationship between the center of the wheel and the instantaneous center causes this moment to shorten the distance in the vertical direction between the center of the wheel and the instantaneous center. As a result, the height of the instantaneous center positioned at the vehicle body side (accordingly, the section of the vehicle body above the wheel) is lowered. Thus, the above-mentioned moment functions as the height lowering force.

The present invention aims to prevent that an excessive roll angle occurs on a vehicle by utilizing the height lowering force. Specifically, as described above, when the degree of tendency that the excessive roll angle occurs becomes equal to or greater than the first predetermined degree, the inner-wheel braking force for generating the height lowering force is given to the wheel at the inner side of the turning direction, whereby the inner-wheel braking force functions as force for preventing that the height of the vehicle body at the inner side of the turning direction is increased. As a result, the increase in the roll angle of the vehicle is restrained, thereby being capable of preventing the occurrence of an excessive roll angle. Further, when the braking force is given to the wheel at the inner side of the turning direction, a yawing moment is caused on the vehicle in the direction same as the turning direction, thereby also being capable of satisfactorily keeping tracing performance.

In this case, the inner-wheel braking force controlling means is preferably configured to give the inner-wheel braking force on the rear wheel at the inner side of the turning direction, that is the wheel at the inner side. In case where an excessive roll angle occurs on the vehicle, the vehicle height frequently becomes the lowest at the front side at the outer side of the turning direction and highest at the back side at the inner side of the turning direction in general. Accordingly, the configuration described above that the inner-wheel braking force is given to the rear wheel at the inner side of the turning direction can prevent that the height of the vehicle body at the back side section at the inner side of the turning direction is increased, and hence, the occurrence of an excessive roll angle on the vehicle can effectively be prevented.

Moreover, the inner-wheel braking force controlling means is preferably configured such that the value of the inner-wheel braking force is changed according to the degree of tendency that the excessive roll angle occurs, that is indicated by the excessive roll angle occurrence tendency index value. According to this, the value of the inner-wheel braking force can be set greater as the degree of tendency that the excessive roll angle occurs is increased. Accordingly, the value of the inner-wheel braking force can appropriately be set to a suitable value according to the degree that the occurrence of the excessive roll angle should be prevented.

Any one of the above-mentioned vehicle motion control devices is preferably configured to be further provided with outer-wheel braking force controlling means that exerts outer-wheel braking force for generating a yawing moment on the wheel at the outer side of the turning direction in the direction opposite to the turning direction when the vehicle is in the turning state and the degree of tendency that the excessive roll angle occurs, that is indicated by the obtained excessive roll angle occurrence tendency index value, becomes equal to or greater than a second predetermined degree. Here, the degree of tendency, corresponding to the second predetermined degree, that the excessive roll angle occurs may be set equal to the degree of tendency, corresponding to the first predetermined degree, that the excessive roll angle occurs.

As previously explained, when the inner-wheel braking force is given to the wheel at the inner side of the turning direction of the vehicle, the increase in the roll angle can be prevented due to the action of the height lowering force. However, the yawing moment in the direction same as the turning direction occurs on the vehicle, thereby increasing the centrifugal force exerted on the vehicle. Accordingly, from this viewpoint, giving only the inner-wheel braking force leads to the increase in the roll angle of the vehicle body particularly because the height of the vehicle body at the outer side of the turning direction is lowered.

With respect to this, it is configured that the outer-wheel braking force for generating a yawing moment on the wheel at the outer side of the turning direction in the direction opposite to the turning direction is also given in addition to the inner-wheel braking force, when the vehicle is in the turning state and the degree of tendency that the excessive roll angle occurs, that is indicated by the obtained excessive roll angle occurrence tendency index value, becomes equal to or greater than a second predetermined degree, whereby (at least a part of) the yawing moment generated in the turning direction based upon the inner-wheel braking force can be eliminated. Consequently, the increase in the roll angle of the vehicle, that is based upon the factor that the height of the vehicle body at the outer side of the turning direction is lowered, is restrained, thereby being capable of more effectively preventing the occurrence of the excessive roll angle.

In this case, the degree of tendency, corresponding to the second predetermined degree, that the excessive roll angle occurs is preferably set greater than the degree of tendency, corresponding to the first predetermined degree, that the excessive roll angle occurs. According to this, the outer-wheel braking force is started to be exerted after the inner-wheel braking force is started to be exerted, during the process of increasing the degree of tendency that the excessive roll angle occurs. Therefore, the outer-wheel braking force is started to be exerted with the state that the increase in the height of the vehicle body at the inner side of the turning direction is surely prevented, thereby being capable of more surely preventing the occurrence of the excessive roll angle.

Moreover, the outer-wheel braking force controlling means is preferably configured to give the outer-wheel braking force on the front wheel at the outer side of the turning direction that is the outer wheel. When the vehicle is in the decelerating state, a load exerted on the front wheel increases due to inertia force exerted on the vehicle, so that, if the braking force is given to the front wheel, this braking force effectively functions as the decelerating force for decelerating the vehicle. Consequently, the configuration in which the outer-wheel braking force is given to the front wheel at the outer side of the turning direction as described above enables to further reduce an actual lateral acceleration exerted on the vehicle both by the action of the yawing moment in the direction opposite to the turning direction of the vehicle and the action of the decelerating force. As a result, the occurrence of an excessive roll angle on the vehicle can more effectively be prevented.

Moreover, the outer-wheel braking force controlling means is preferably configured such that the value of the outer-wheel braking force is changed according to the degree of tendency that the excessive roll angle occurs, that is indicated by the excessive roll angle occurrence tendency index value. According to this, the value of the outer-wheel braking force can be set greater as the degree of tendency that the excessive roll angle occurs is increased. Accordingly, the value of the outer-wheel braking force can appropriately be set to a suitable value according to the degree that the occurrence of the excessive roll angle should be prevented.

BRIEF DESCRIPTION OF THE DRAWINGS

FIG. 3 is a view showing one example of braking force exerted on each wheel of a vehicle in case where a roll-over preventing control is executed during when the vehicle is turning in the counterclockwise direction (seen from the top of the vehicle);

FIG. 4 is a flowchart executed by the CPU shown in FIG. 1 for calculating a wheel speed or the like;

DESCRIPTION OF THE PREFERRED EMBODIMENT

Figure 1:
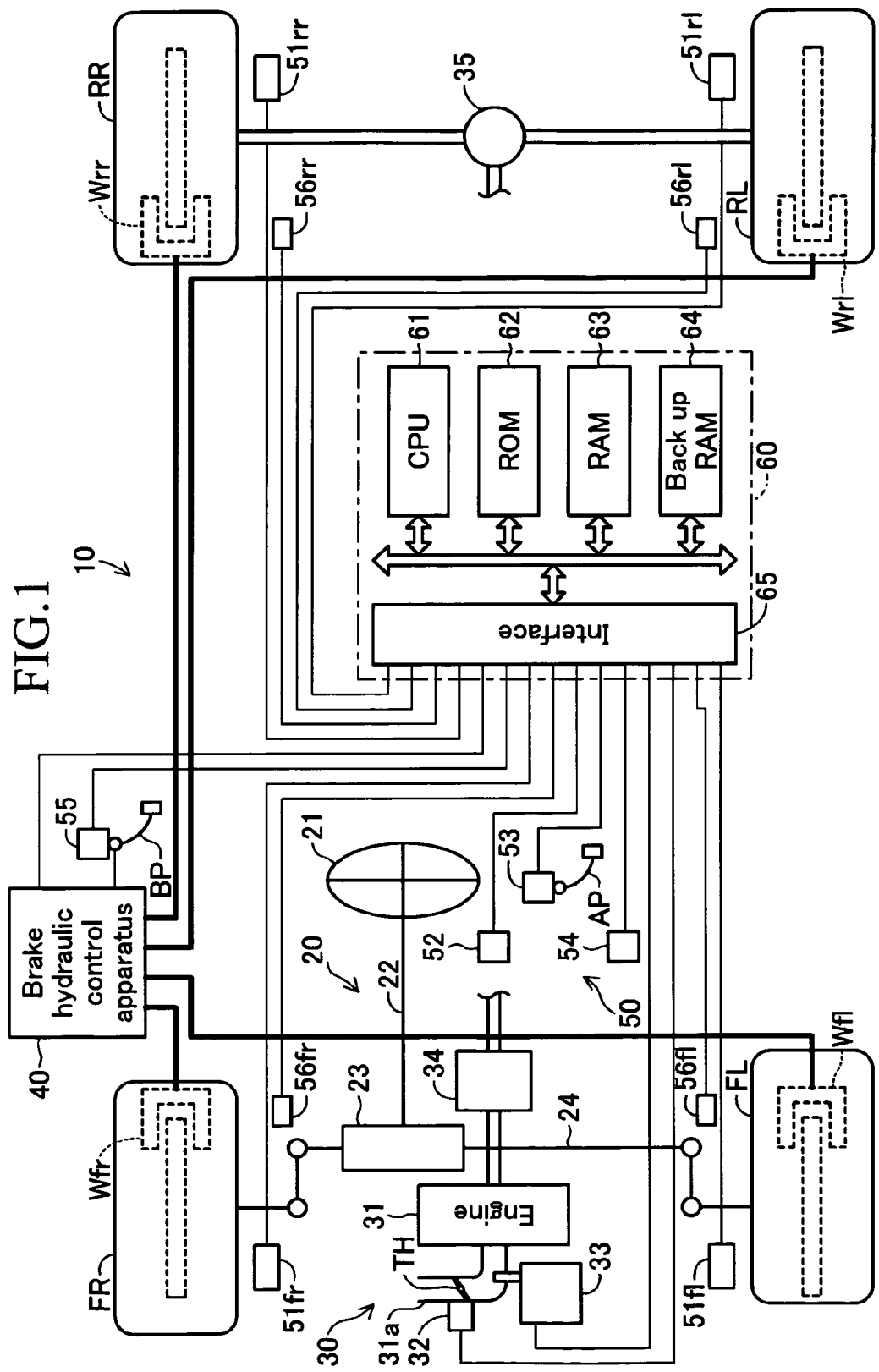
FIG. 1 is a schematic constructional view of a vehicle having mounted thereto a vehicle motion control device according to an embodiment of the present invention.

A preferred embodiment of a vehicle motion control device according to the present invention will be explained hereinbelow with reference to drawings. FIG. 1 shows a schematic construction of a vehicle provided with a vehicle control device 10 according to the embodiment of the invention. This vehicle is a four-wheel drive vehicle using a two-wheel steering rear-wheel drive system and having a pair of front wheels (front-left wheel FL and front-right wheel FR) that are steering wheels as well as non-driving wheels and a pair of rear wheels (rear-left wheel RL and rear-right wheel RR) that are non-steering wheels as well as driving wheels.

The vehicle motion control device 10 is configured to include a front-wheel steering mechanism 20 for steering the steering wheels FL and FR, a driving force transmission section 30 that produces driving force and respectively transmits this driving force to each driving wheel RL and RR, a brake hydraulic control apparatus 40 for producing braking force by brake fluid pressure on each wheel, a sensor section 50 composed of various sensors and an electrical control apparatus 60.

The front-wheel steering mechanism 20 is composed of a steering 21, column 22 integrally pivotable with the steering 21, steering actuator 23 linked to the column 22 and a link mechanism 24 including a tie rod that is moved in the side-to-side direction of the vehicle body by the steering actuator 23 and a link that can steer the steering wheels FL and FR by the movement of the tie rod. By this configuration, rotating the steering 21 from its center position (reference position) changes the steering angles of the steering wheels FL and FR from the reference angle at which the vehicle runs straight.

The steering actuator 23 is composed to include a known so-called hydraulic power steering device that generates assisting force for moving the tie rod according to the rotational torque of the column 22, thereby shifting the tie rod from the neutral position to the side-to-side direction of the vehicle by the assisting force in proportion to the steering angle θs from the neutral position of the steering 21. The configuration and operation of the steering actuator 23 are well known, so that the detailed explanation thereof is omitted here.

The driving force transmission section 30 is configured to include an engine 31 that produces driving force, a throttle valve actuator 32 arranged in an inlet pipe 31a of the engine 31 and having a DC motor for controlling an opening of a throttle valve TH that can modulate the cross-sectional area of the inlet path, a fuel injection device 33 including an injector that injects fuel to the vicinity of an inlet port (not shown) of the engine 31, a transmission 34 connected to the output shaft of the engine 31 and a differential gear 35 that suitably distributes and transmits the driving force transmitted from the transmission 34 to rear wheels RR and RL.

Figure 2:
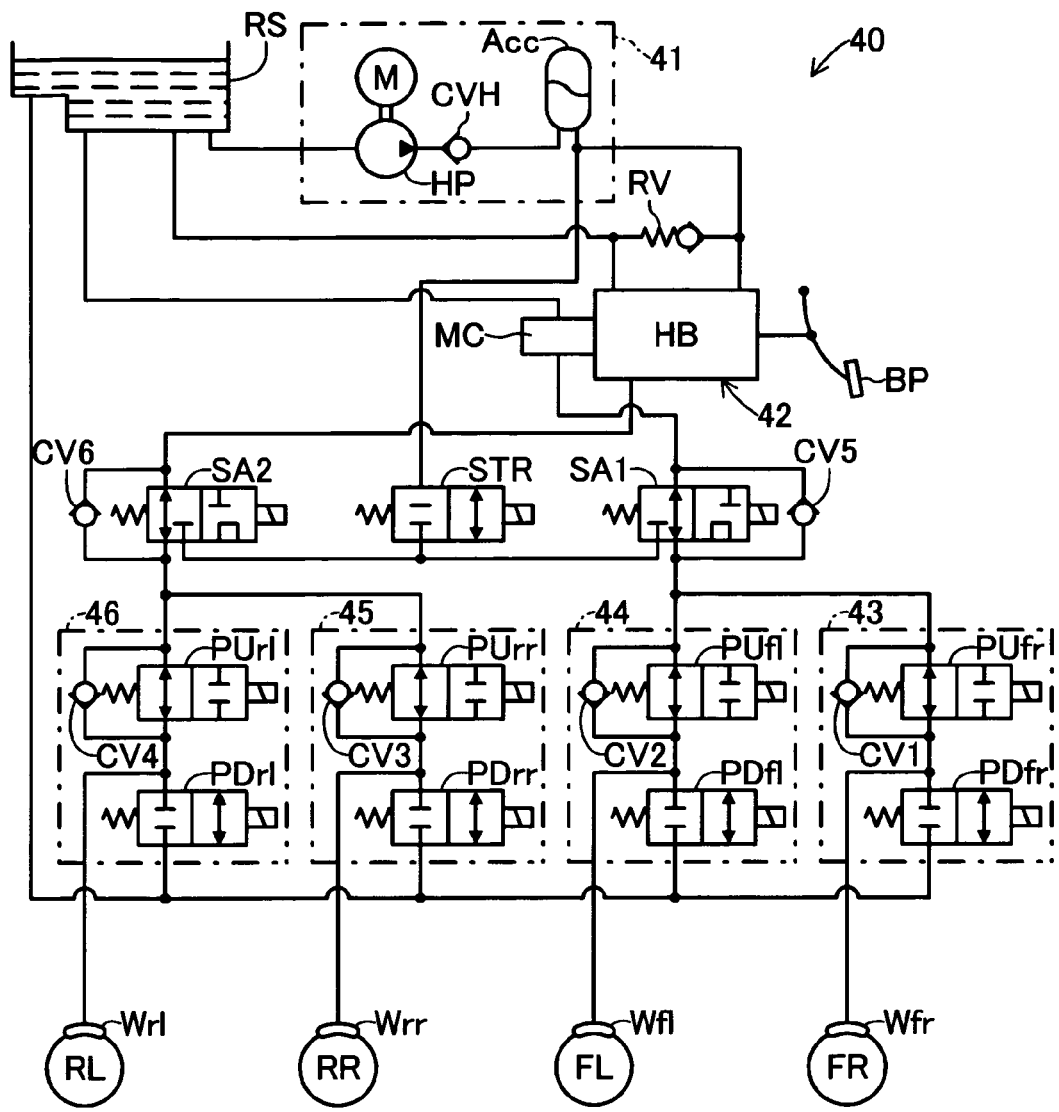
FIG. 2 is a schematic constructional view of a brake hydraulic control device shown in FIG. 1.

The brake hydraulic control apparatus 40 whose construction is schematically shown in FIG. 2 is configured to include a high-pressure generating section 41, a brake fluid pressure generating section 42 that generates brake fluid pressure according to operating force on a brake pedal BP, and an FR brake fluid pressure adjusting section 43, an FL brake fluid pressure adjusting section 44, an RR brake fluid pressure adjusting section 45 and an RL brake fluid pressure adjusting section 46 that are capable of adjusting brake fluid pressure supplied respectively to wheel cylinders Wfr, Wfl, Wrr and Wrl each arranged at each wheel FR, FL, RR and RL.

The high-pressure generating section 41 is configured to include an electric motor M, a hydraulic pump HP driven by the electric motor M and pressurizing brake fluid in a reservoir RS and an accumulator Acc that is connected to the discharge side of the hydraulic pump HP via a check valve CVH and stores brake fluid pressurized by the hydraulic pump HP.

The electric motor M is driven when the fluid pressure in the accumulator Acc is less than a predetermined lower limit value, while it is halted when the fluid pressure in the accumulator Acc exceeds a predetermined upper limit value. By this, the fluid pressure in the accumulator Acc is always kept high within a predetermined range.

A relief valve RV is arranged between the accumulator Acc and the reservoir RS. When the fluid pressure in the accumulator Acc becomes extraordinarily higher than the above-mentioned high pressure, the brake fluid in the accumulator Acc is returned to the reservoir RS. This operation protects a hydraulic circuit in the high-pressure generating section 41.

The brake hydraulic generating section 42 is composed of a hydraulic booster HB that is driven according to the operation of the brake pedal BP and a master cylinder MC connected to the hydraulic booster HB. The hydraulic booster HB assists the operating force on the brake pedal BP at a predetermined ratio by utilizing the above-mentioned high pressure supplied from the high-pressure generating section 41 and transmits the assisted operating force to the master cylinder MC.

The master cylinder MC generates master cylinder fluid pressure according to the assisted operating force. Further, the hydraulic booster HB, by inputting this master cylinder fluid pressure, generates regulator fluid pressure that is approximately equal to the master cylinder fluid pressure according to the assisted operating force. The constructions and operations of the master cylinder MC and hydraulic booster HB are well known, so that their detailed explanations are omitted here. As described above, the master cylinder MC and hydraulic booster HB respectively generate master cylinder fluid pressure and regulator fluid pressure according to the operating force on the brake pedal BP.

A control valve SA1 that is a three-port two-position switching type solenoid-operated valve is arranged between the master cylinder MC and each of the upstream side of the FR brake fluid pressure adjusting section 43 and the upstream side of the FL brake fluid pressure adjusting section 44. Similarly, a control valve SA2 that is a three-port two-position switching type solenoid-operated valve is arranged between the hydraulic booster HB and each of the upstream side of the RR brake fluid pressure adjusting section 45 and the upstream side of the RL brake fluid pressure adjusting section 46. Further, a change-over valve STR that is a two-port two-position switching type, normally closed, solenoid-operated on-off valve is arranged between the high-pressure generating section 41 and each of the control valve SA1 and the control valve SA2.

When the control valve SA1 is in the first position in FIG. 2 (in the non-actuated position), it functions to establish communication between the master cylinder MC and each of the upstream section of the FR brake fluid pressure adjusting section 43 and the upstream section of the FL brake fluid pressure adjusting section 44. When in the second position (in the actuated position), it functions to cut off the communication between the master cylinder MC and each of the upstream section of the FR brake fluid pressure adjusting section 43 and the upstream section of the FL brake fluid pressure adjusting section 44, but to establish the communication between the change-over valve STR and each of the upstream section of the FR brake fluid pressure adjusting section 43 and the upstream section of the FL brake fluid pressure adjusting section 44.

When the control valve SA2 is in the first position in FIG. 2 (in the non-actuated position), it functions to establish communication between the hydraulic booster HB and each of the upstream section of the RR brake fluid pressure adjusting section 45 and the upstream section of the RL brake fluid pressure adjusting section 46. When in the second position (in the actuated position), it functions to cut off the communication between the hydraulic booster HB and each of the upstream section of the RR brake fluid pressure adjusting section 45 and the upstream section of the RL brake fluid pressure adjusting section 46, but to establish the communication between the change-over valve STR and each of the upstream section of the RR brake fluid pressure adjusting section 45 and the upstream section of the RL brake fluid pressure adjusting section 46.

By this operation, master cylinder fluid pressure is supplied to each of the upstream section of the FR brake fluid pressure adjusting section 43 and the upstream section of the FL brake fluid pressure adjusting section 44 when the control valve SA1 is placed at the first position, while high pressure generated from the high-pressure generating section 41 is supplied thereto when the control valve SA1 is placed at the second position and the change-over valve STR is placed at the second position (at the actuated position).

Similarly, regulator fluid pressure is supplied to each of the upstream section of the RR brake fluid pressure adjusting section 45 and the upstream section of the RL brake fluid pressure adjusting section 46 when the control valve SA2 is placed at the first position, while high pressure generated from the high-pressure generating section 41 is supplied thereto when the control valve SA2 is placed at the second position and the change-over valve STR is placed at the second position.

The FR brake fluid pressure adjusting section 43 is composed of a pressure increasing valve PUfr that is a two-port two-position switching type, normally opened, solenoid-operated on-off valve and a pressure reducing valve PDfr that is a two-port two-position switching type, normally closed, solenoid-operated on-off valve. The pressure increasing valve PUfr, when placed at the first position in FIG. 2 (at the non-actuated position), establishes a communication between the upstream section of the FR brake fluid pressure adjusting section 43 and the wheel cylinder Wfr, while it cuts off the communication between the upstream section of the FR brake fluid pressure adjusting section 43 and the wheel cylinder Wfr when placed at the second position (at the actuated position). The pressure reducing valve PDfr cuts off the communication between the wheel cylinder Wfr and the reservoir RS when it is placed at the first position in FIG. 2 (at the non-actuated position), while it establishes the communication between the wheel cylinder Wfr and the reservoir RS when placed at the second position (at the actuated position).

By this operation, the brake fluid pressure in the wheel cylinder Wfr is increased when the pressure increasing valve PUfr and the pressure reducing valve PDfr are placed at the first position since the fluid pressure at the upstream section of the FR brake fluid pressure adjusting section 43 is supplied into the wheel cylinder Wfr. When the pressure increasing valve PUfr is placed at the second position and the pressure reducing valve PDfr is placed at the first position, the brake fluid pressure in the wheel cylinder Wfr is kept to be the fluid pressure at the time in the wheel cylinder Wfr regardless of the fluid pressure at the upstream section of the FR brake fluid pressure adjusting section 43. When the pressure increasing valve PUfr and the pressure reducing valve PDfr are placed at the second position, the brake fluid in the wheel cylinder Wfr is returned to the reservoir RS to thereby reduce the fluid pressure.

A check valve CV1 is arranged in parallel to the pressure increasing valve PUfr for allowing only one-way flow of the brake fluid from the wheel cylinder Wfr side to the upstream section of the FR brake fluid pressure adjusting section 43. This arrangement brings a rapid reduction of the brake fluid pressure in the wheel cylinder Wfr when the brake pedal BP is released with the control valve SA1 placed at the first position.

Similarly, the FL brake fluid pressure adjusting section 44, RR brake fluid pressure adjusting section 45 and RL brake fluid pressure adjusting section 46 are respectively composed of a pressure increasing valve PUfl and pressure reducing valve PDfl, a pressure increasing valve PUrr and pressure reducing valve PDrr and a pressure increasing valve PUrl and pressure reducing valve PDrl. The position of each pressure increasing valve and pressure reducing valve is controlled, whereby the brake fluid pressure in the wheel cylinder Wfl, wheel cylinder Wrr and wheel cylinder Wrl can be increased, kept and reduced. Further, check valves CV2, CV3 and CV4 that can attain the function same as that of the check valve CV1 are respectively arranged in parallel to the pressure increasing valves PUfl, PUrr and PUrl.

A check valve CV5 is arranged in parallel to the control valve SA1 for allowing only one-way flow of the brake fluid from the upstream side to the downstream side. When the control valve SA1 is placed at the second position and the communication between the master cylinder MC and each of the FR brake fluid pressure adjusting section 43 and the FL brake fluid pressure adjusting section 44 is cut off, the brake fluid pressure in the wheel cylinders Wfr and Wfl can be increased by operating the brake pedal BP. Further, arranged in parallel to the control valve SA2 is a check valve CV6 that can attain the function same as that of the check valve CV5.

By the construction described above, the brake hydraulic control apparatus 40 can supply brake fluid pressure according to the operating force on the brake pedal BP to each wheel cylinder when all the solenoid-operated valves are in the first position. Further, under this state, it can reduce, for example, only the brake fluid pressure in the wheel cylinder Wrr by a predetermined amount by controlling the pressure increasing valve PUrr and pressure reducing valve PDrr.

By changing the control valve SA1, change-over valve STR and pressure increasing valve PUfl to the second position and controlling the pressure increasing valve PUfr and pressure reducing valve PDfr respectively, the brake hydraulic control apparatus 40 can increase only the brake fluid pressure in the wheel cylinder Wfr by a predetermined value by utilizing the high pressure generated from the high-pressure generating section 41 while the brake fluid pressure in the wheel cylinder Wfl is maintained under a state where the brake pedal BP is not operated (is released). As described above, the brake hydraulic control apparatus 40 independently controls the brake fluid pressure in the wheel cylinder of each wheel regardless of the operation on the brake pedal BP, thereby being capable of exerting predetermined braking force on every independent wheel.

Referring again to FIG. 1, the sensor section 50 is composed of wheel speed sensors 51fl, 51fr, 51rl and 51rr each constructed by a rotary encoder that outputs a signal having a pulse every time each wheel FL, FR, RL and RR rotates at a predetermined angle, a steering angle sensor 52, serving as steering operating amount obtaining means, for detecting the angle of rotation from the neutral position of the steering 21 to output a signal showing a steering angle θs (deg), an accelerator opening sensor 53 that detects an operating amount of an accelerator pedal AP operated by a driver and outputs a signal showing the operating amount Accp of the accelerator pedal AP, a lateral acceleration sensor 54 that detects an actual lateral acceleration, as an excessive roll angle occurrence tendency index value, which is a component in the side-to-side direction of a vehicle body of the acceleration actually exerted on the vehicle, and outputs a signal showing the actual lateral acceleration Gy (m/s$^2$) for serving as index value obtaining means, a brake switch 55 that detects whether the brake pedal BP is operated or not by the driver for outputting a signal showing that the braking operation is performed or not and height sensors 56fl, 56fr, 56rl and 56rr each detecting a height of a specified section of the vehicle body (each wheel section) in the vicinity of each wheel FL, FR, RL and RR from the road surface and outputting each signal showing each height Hfl, Hfr, Hrl and Hrr of each wheel section.

The steering angle θs is set to be "0" when the steering 21 is positioned at the neutral position, set to a positive value when the steering 21 is rotated in the counterclockwise direction (seen by a driver) from the neutral position, and set to a negative value when the steering 21 is rotated in the clockwise direction from the neutral position. Further, the actual lateral acceleration Gy is set to be a positive value when the vehicle is turning in the counterclockwise direction(seen from the top of the vehicle), while set to be a negative value when the vehicle is turning in the clockwise direction (seen from the top of the vehicle).

The electrical control apparatus 60 is a microcomputer including a CPU 61, a ROM 62 that stores in advance a routine (program) executed by the CPU 61, table (look-up table, map), constant or the like, a RAM 63 to which the CPU 61 temporarily stores data as needed, a back-up RAM 64 that stores data with a power supply turned on and holds the stored data even during a period when the power supply is turned off and an interface 65 including an AD converter, those of which are connected to one another with a bus. The interface 65 is connected to the sensors 51 to 56, thereby supplying to the CPU 61 signals from the sensors 51 to 56 and transmitting a driving signal to each solenoid-operated valve and motor M of the brake hydraulic control apparatus 40, the throttle valve actuator 32 and the fuel injection device 33 according to the instruction from the CPU 61.

By this operation, the throttle valve actuator 32 drives the throttle valve TH such that the opening thereof becomes an opening according to the operating amount Accp of the accelerator pedal AP, and the fuel injection device 33 injects fuel in a required amount so as to obtain a predetermined target air-fuel ratio (theoretical air-fuel ratio) concerning intake air mass according to the opening of the throttle valve TH.

[Outline of Vehicle Motion Control]

The vehicle motion control device 10 calculates the target lateral acceleration Gyt (m/s$^2$) based upon a following formula (1) that is a theoretical formula as a predetermined rule directed from a vehicle motion model. The target lateral acceleration Gyt is set to the positive value when the steering angle θs (deg) is a positive value, while it is set to the negative value when the steering angle θs is a negative value. This theoretical formula is a formula for calculating a theoretical value of the lateral acceleration exerted on the vehicle when the vehicle turns with the steering angle and vehicle body speed constant (upon the normal circular turn).

$$Gyt = (Vso^2 \cdot \theta s)/(n \cdot l) \cdot (1/(1+Kh \cdot Vso^2)) \tag{1}$$

In the above formula (1), Vso is a calculated estimated body speed (m/s) as described later. Further, n is a gear ratio (constant value) that is a ratio of a change amount of a rotation angle of the steering 21 to a change amount of a turning angle of the steering wheels FL and FR, l is a wheel base (m) of the vehicle that is a constant value determined by the vehicle body, and Kh is a stability factor (s$^2$/m$^2$) that is a constant value determined by the vehicle body.

Further, this device also calculates a lateral acceleration deviation ΔGy (m/s$^2$), based upon the formula (2) described later, that is a deviation between the absolute value of the target lateral acceleration Gyt calculated as described above and the absolute value of the actual lateral acceleration Gy detected by the lateral acceleration sensor 54.

$$\Delta Gy = |Gyt| - |Gy| \tag{2}$$

[Understeer Restraining Control]

When the value of the lateral acceleration deviation ΔGy is not less than the positive predetermined value, the vehicle is in a state where the turning radius is greater than the turning radius of when the target lateral acceleration Gyt is assumed to be caused on the vehicle (hereinafter referred to as "understeer state"), whereby this device judges that the turning state of the vehicle is the understeer state and executes an understeer restraining control (hereinafter referred to as "US restraining control") for restraining the understeer state.

Specifically, this device exerts predetermined braking force according to the value of the lateral acceleration deviation ΔGy on only the rear wheel at the inner side of the turning direction, thereby forcibly producing a yawing moment on the vehicle in the direction same as the turning direction. This allows to increase the absolute value of the actual lateral acceleration Gy, so that the actual lateral acceleration Gy is controlled to be close to the target lateral acceleration Gyt.

[Oversteer Restraining Control]

On the other hand, when the value of the lateral acceleration deviation ΔGy is not more than a negative predetermined value −Gy1, the vehicle is in a state where the turning radius is smaller than the turning radius of when the target lateral acceleration Gyt is assumed to be caused on the vehicle (hereinafter referred to as "oversteer state"), whereby this device judges that the turning state of the vehicle is the oversteer state and executes an oversteer restraining control (hereinafter referred to as "OS restraining control") for restraining the overseer state.

Specifically, this device exerts predetermined braking force according to the value of the lateral acceleration deviation ΔGy on only the front wheel at the outer side of the turning direction, thereby forcibly producing a yawing moment on the vehicle in the direction opposite to the turning direction. This allows to decrease the absolute value of the actual lateral acceleration Gy, so that the actual lateral acceleration Gy is controlled to be close to the target lateral acceleration Gyt.

As described above, the understeer restraining control or the oversteer restraining control is executed, whereby this device controls the braking force that should be exerted on each wheel, thereby producing a predetermined yawing moment on the vehicle in the direction that the actual lateral acceleration Gy is close to the target lateral acceleration Gyt calculated according to the above-mentioned formula (1).

[Roll-Over Preventing Control]

Moreover, when the absolute value (the degree of a tendency that an excessive roll angle occurs on the vehicle) of the actual lateral acceleration Gy detected by the lateral acceleration sensor 54 is not less than a roll-over preventing control starting reference value Gyth (in this embodiment the value equal to a rear-wheel-side reference value Gyr), which means that there is a tendency that an excessive roll angle occurs on the vehicle body, this device executes a roll-over preventing control for restraining (decreasing) an increase in the roll angle generated according to the absolute value of the actual lateral acceleration Gy. It should be noted that, when the roll-over preventing control is executed (i.e., when the absolute value of the actual lateral acceleration Gy is not less than the roll-over preventing control starting reference value Gyth), the aforesaid understeer restraining control and oversteer restraining control are not executed. In other words, the execution of the roll-over preventing control has priority over the execution of the understeer restraining control and oversteer restraining control.

Specifically, as shown in FIG. 3 showing one example of braking force exerted on each wheel of the vehicle in case where the roll-over preventing control is executed during when the vehicle turns in the counterclockwise direction (seen from the top of the vehicle), this device firstly exerts predetermined braking force (inner-wheel braking force) according to the absolute value of the actual lateral acceleration Gy on only the rear wheel (rear-left wheel RL in FIG. 3) at the inner side of the turning direction as shown in FIG. 3(*b*), when the absolute value of the actual lateral acceleration Gy is not less than a roll-over preventing control starting reference value Gyth (=rear-wheel-side reference value Gyr). This rear-wheel-side reference value Gyr corresponds to a first predetermined degree.

The inner-wheel braking force increases from "0" with a predetermined slope until it reaches a rear-wheel-side reference upper limit value fr, as the absolute value of the actual lateral acceleration Gy increases from the rear-wheel-side reference value Gyr. After the inner-wheel braking force reaches the rear-wheel-side reference upper limit value fr, it is set so as to keep the rear-wheel-side reference upper limit value fr even if the absolute value of the actual lateral acceleration Gy increases. This inner-wheel braking force causes the aforesaid height lowering force at the vehicle rear-side section of the inner side of the turning direction, thereby being capable of preventing that the height of the vehicle rear-side section of the inner side of the turning direction increases (i.e., being capable of keeping the lowered height). Therefore, the increase in the roll angle caused on the vehicle body is restrained.

Additionally, this device also exerts predetermined braking force (outer-wheel braking force) according to the absolute value of the actual lateral acceleration Gy on the front wheel (front-right wheel FR in FIG. 3) at the outer side of the turning direction as shown in FIG. 3(*a*), when the absolute value of the actual lateral acceleration Gy becomes not less than a front-wheel-side reference value Gyf that is greater than the rear-wheel-side reference value Gyr. This front-wheel-side reference value Gyf corresponds to a second predetermined degree.

The outer-wheel braking force increases from "0" with a predetermined slope until it reaches a front-wheel-side reference upper limit value ft, as the absolute value of the actual lateral acceleration Gy increases from the front-wheel-side reference value Gyf. After the outer-wheel braking force reaches the front-wheel-side reference upper limit value ft, it is set so as to keep the front-wheel-side reference upper limit value ff even if the absolute value of the actual lateral acceleration Gy increases. By this outer-wheel braking force, a yawing moment is forcibly generated on the vehicle in the direction opposite to the turning direction. As a result, the absolute value of the actual lateral acceleration Gy is decreased, thereby controlling the increase in the roll angle caused on the vehicle body.

As described above, in case where the absolute value of the actual lateral acceleration Gy, that serves as the excessive roll angle occurrence tendency index value, becomes not less than the rear-wheel-side reference value Gyr, this device causes the inner-wheel braking force, according to the absolute value of the actual lateral acceleration Gy, only on the rear wheel at the inner side of the turning direction when the absolute value of the actual lateral acceleration Gy is not less than the rear-wheel-side reference value Gyr and not more than the front-wheel-side reference value Gyf, while it keeps to cause the inner-wheel braking force, according to the absolute value of the actual lateral acceleration Gy, on the rear wheel at the inner side of the turning direction as well as causes the outer-wheel braking force, according to the absolute value of the actual lateral acceleration Gy, also on the front wheel at the outer side of the turning direction when the absolute value of the actual lateral acceleration Gy is not less than the front-wheel-side reference value Gyf.

As described above, this device executes the US restraining control, OS restraining control and roll-over preventing control (hereinafter generically referred to as "stability control upon turning") to thereby exert predetermined braking force on each wheel for ensuring stability of the vehicle. Further, when any one of anti-skid control, front-rear braking force distribution control and traction control described later is also required to be executed upon executing the stability control upon turning, this device finally determines the braking force that should be exerted on each wheel by considering also the braking force that should be exerted on each wheel for executing any one of the above-mentioned controls. The above description is about the outline of the vehicle motion control.

(Actual Operation)

Subsequently, the actual operation of the vehicle motion control device 10 of the present invention and having the above-mentioned construction will be explained hereinbelow with reference to FIGS. 4 to 9 showing routines with flowcharts executed by the CPU 61 of the electrical control apparatus 60. The symbol "" marked at the end of the various variables, flags, symbols or the like is a comprehensive expression of "fl", "fr" or the like marked at the end of the various variables, flags or symbols for showing which wheel such as FR or the like is related to the various variables, flags, symbols or the like. For example, the wheel speed Vw comprehensively represents the front-left wheel speed Vwfl, front-right wheel speed Vwfr, rear-left wheel speed Vwrl and rear-right wheel speed Vwrr.

Figure 4:
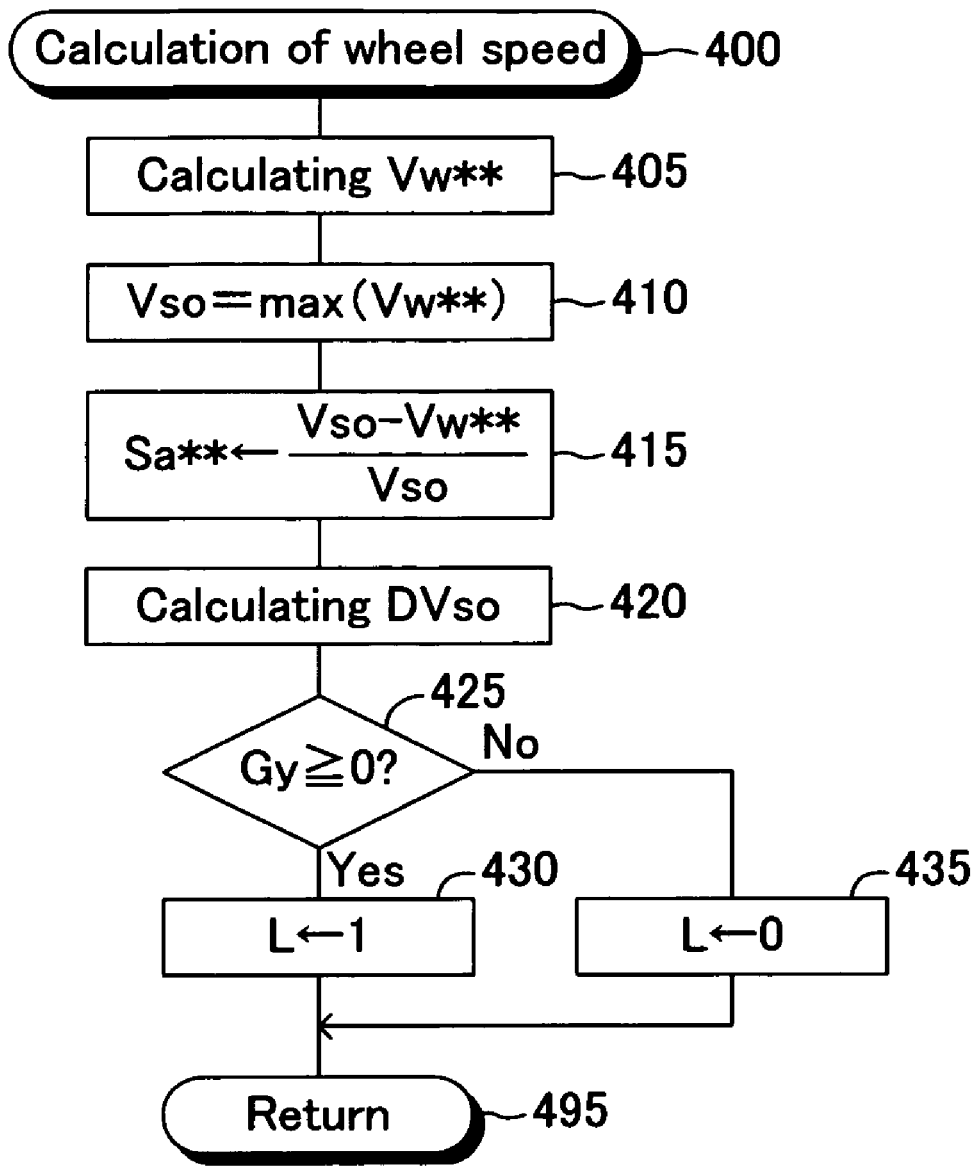

The CPU 61 repeatedly executes a routine shown in FIG. 4 for calculating the wheel speed Vw or the like once every predetermined period. Accordingly, the CPU 61 starts the process from a step 400 at a predetermined timing, and then proceeds to a step 405 to respectively calculate the wheel speed (outer peripheral speed of a tire) Vw (m/s) of each wheel FR or the like. Specifically, the CPU 61 calculates the respective wheel speeds Vw of each wheel FR or the like based upon a time interval of a pulse possessed by a signal outputted from each wheel speed sensor 51**\*\*.

Then, the CPU 61 moves to a step 410 to calculate the maximum value among the wheel speeds Vw\*\* of each wheel FR as the estimated body speed Vso. It is to be noted that the average value of the wheel speeds Vw\*\* of each wheel FR or the like may be calculated as the estimated body speed Vso.

Then, the CPU 61 moves to a step 415 to calculate an actual slip ratio Sa\*\* of every wheel based upon the estimated body speed Vso calculated at the step 410, the value of the wheel speeds Vw\*\* of each wheel FR or the like calculated at the step 405 and the formula described in the step 415. This actual slip ratio Sa\*\* is used for calculating the braking force that should be exerted on each wheel as described later. Then, the CPU 61 proceeds to a step 420 for calculating an estimated vehicle body acceleration DVso that is a time derivative value of the estimated body speed Vso based upon a formula (3) described later. In the formula (3), Vso1 is the previous estimated body speed calculated at the step 410 at the time of the previous execution of this routine, while Δt is the above-mentioned predetermined time that is the operation period of this routine.

$$DVso=(Vso-Vso1)/\Delta t \quad (3)$$

Subsequently, the CPU 61 moves to a step 425 to determine whether the value of the actual lateral acceleration Gy detected by the lateral acceleration sensor 54 is not less than "0" or not. If the value of the actual lateral acceleration Gy is not less than "0", the CPU 61 makes "YES" determination at the step 425, and then, moves to a step 430 to set a turning direction indicating flag L to "1". Then, the CPU 61 moves to a step 495 to temporarily terminate this routine. Further, if the value of the actual lateral acceleration Gy is a negative value, the CPU 61 makes "NO" determination at the step 425, and then, proceeds to a step 435 to set the turning direction indicating flag L to "0". Then, the CPU 61 moves to the step 496 to temporarily terminate this routine.

The turning direction indicating flag L indicates that the vehicle turns in the counterclockwise direction (seen from the top of the vehicle) when the value thereof is "1", while indicates that the vehicle turns in the clockwise direction (seen from the top of the vehicle) when the value thereof is "0". Accordingly, the turning direction of the vehicle is specified by the value of the turning direction indicating flag L.

Subsequently explained is the calculation of the lateral acceleration deviation. The CPU 61 repeatedly executes a routine shown in FIG. 5 once every predetermined period. Accordingly, the CPU 61 starts the process from a step 500 at a predetermined timing, and then proceeds to a step 505 to calculate the target lateral acceleration Gyt based upon the value of the steering angle θs detected by the steering angle sensor 52, the value of the estimated body speed Vso calculated at the step 410 in FIG. 4 and the formula described in the step 505 and corresponding to the right side of the formula (1).

Then, the CPU 61 proceeds to a step 510 to calculate the lateral acceleration deviation ΔGy based upon the value of the target lateral acceleration Gyt calculated at the step 505, the value of the actual lateral acceleration Gy detected by the lateral acceleration sensor 54 and the formula described in the step 510 and corresponding to the right side of the formula (2). Then, the CPU 61 proceeds to a step 595 to temporarily terminate this routine.

Subsequently explained is the calculation of the target slip ratio of each wheel required to determine the braking force that should be exerted on each wheel upon executing only the above-mentioned OS-US restraining control. The CPU 61 repeatedly executes a routine shown in FIG. 6 once every predetermined period. Accordingly, the CPU 61 starts the process from a step 600 at a predetermined timing, and then proceeds to a step 605 to determine whether the value of the actual lateral acceleration Gy detected by the lateral acceleration sensor 54 is smaller than the roll-over preventing control starting reference value Gyth (=rear-wheel-side reference value Gyr) or not. If the CPU 61 makes "NO" determination, it immediately proceeds to a step 695 to temporarily terminate this routine. This corresponds to the case where the OS-US restraining control is not executed.

The explanation is continued here assuming that the absolute value of the actual lateral acceleration Gy is smaller than the roll-over preventing control starting reference value Gyth. The CPU 61 makes "YES" determination at the step 605, and then, proceeds to the step 610 to calculate a control volume G according to the magnitude of the yawing moment that should be exerted on the vehicle with the OS-US restraining control, based upon the absolute value of the lateral acceleration deviation ΔGy calculated at the step 510 in FIG. 5 and the table described in the step 610.

As shown in the table described in the step 610, the control volume G is set to "0" when the absolute value of the lateral acceleration deviation ΔGy is not more than the value Gy1. On the other hand, it is set so as to linearly change from "0" to a positive constant value G1 as the absolute value of the lateral acceleration deviation ΔGy is changed from the value Gy1 to a value Gy2 when the absolute value of the lateral acceleration deviation ΔGy is not less than the value Gy1 and not more than the value Gy2. Further, it is set so as to keep the positive constant value G1 when the absolute value of the lateral acceleration deviation ΔGy is not less than the value Gy2. In other words, the OS-US restraining control is not executed when the absolute value of the lateral acceleration deviation ΔGy is not less than the value Gy1, while the control volume G is determined according to the absolute value of the lateral acceleration deviation ΔGy based upon the table described in the step 610 when the absolute value of the lateral acceleration deviation ΔGy is not less than the value Gy1.

Figure 5:
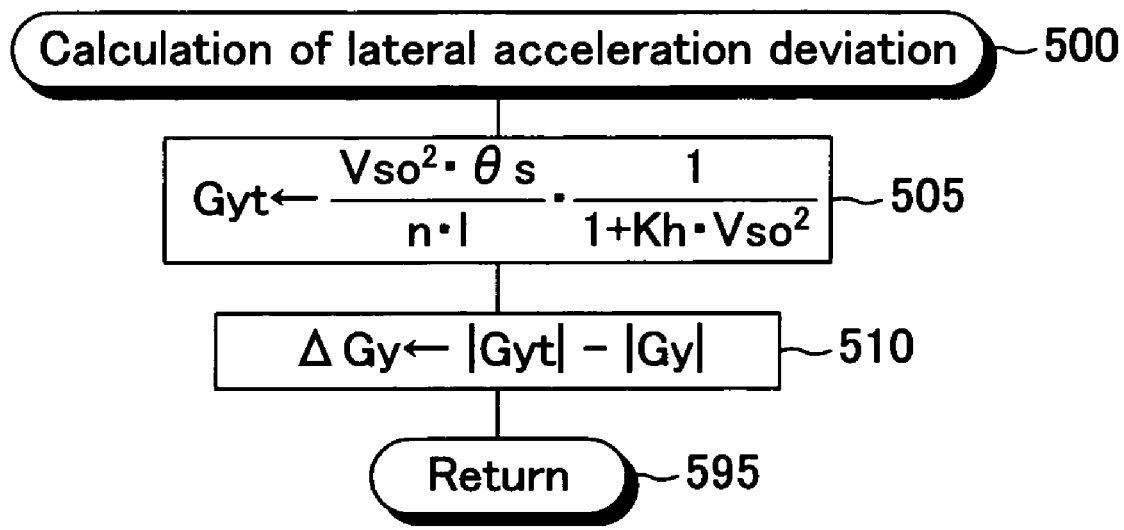
FIG. 5 is a flowchart executed by the CPU shown in FIG. 1 for calculating a lateral acceleration deviation.

Then, the CPU 61 proceeds to a step 615 to determine whether the value of the lateral acceleration deviation ΔGy calculated at the step 510 in FIG. 5 is not less than "0" or not. In case where the value of the lateral acceleration deviation ΔGy is not less than "0" (actually, in case where the value of the lateral acceleration deviation ΔGy is not less than the value Gy1), the CPU 61 judges that the vehicle is in the understeer state as previously explained, so that it moves to a step 620 and the following steps for calculating the target slip ratio of each wheel upon executing the understeer restraining.

Moving to the step 620, the CPU 61 judges whether the value of the turning direction indicating flag L is "1" or not. When it makes "YES" determination at the step 620 (in case where the vehicle is turning in the counterclockwise direction seen from the top of the vehicle), the CPU 61 proceeds to a step 625 to set a value obtained by multiplying together a coefficient Kb and the control volume G as the target slip ratio Strl of the rear-left wheel RL as well as set all the target slip ratios Stfl, Stfr and Strr of the other wheels FL, FR and RR to "0". Then, the CPU 61 proceeds to a step 695 to temporarily terminate this routine. This process allows to set the target slip ratio, corresponding to the absolute value of the lateral acceleration deviation ΔGy for causing the yawing moment in the direction same as the turning direction, to only the rear-left wheel RL corresponding to the inside rear wheel in the turning direction in case where the vehicle turns in the counterclockwise direction seen from the top of the vehicle.

On the other hand, when the turning direction indicating flag L is "0" in the judgement of the step 620, the CPU 61 makes "NO" determination at the step 620, and then, proceeds to a step 630 to set a value obtained by multiplying together the coefficient Kb and the control volume G as the target slip ratio Strr of the rear-right wheel RR as well as set all the target slip ratios Stfl, Stfr and Strl of the other wheels FL, FR and RL to "0". Then, the CPU 61 proceeds to the step 695 to temporarily terminate this routine. This process allows to set the target slip ratio, corresponding to the absolute value of the lateral acceleration deviation ΔGy for causing the yawing moment in the direction same as the turning direction, to only the rear-right wheel RR corresponding to the inside rear wheel in the turning direction in case where the vehicle turns in the clockwise direction seen from the top of the vehicle.

On the other hand, when the value of the lateral acceleration deviation ΔGy is a negative value in the judgement at the step 615 (actually when the value of the lateral acceleration deviation ΔGy is not more than the value –Gy1), the CPU 61 judges that the vehicle is in the oversteer state as previously explained, whereby it moves to a step 625 and the following steps.

Each processing at the steps 635 to 645 corresponds to each processing at the steps 620 to 630. When the CPU 61 moves to the step 640 (i.e., when the vehicle is turning in the counterclockwise direction seen from the top of the vehicle), it sets a value obtained by multiplying together the coefficient Kf and the control volume G as the target slip ratio Stfr of the front-right wheel FR as well as set all the target slip ratios Stfl, Strl and Strr of the other wheels FL, RL and RR to "0". Then, the CPU 61 proceeds to the step 695 to temporarily terminate this routine. This process allows to set the target slip ratio, corresponding to the absolute value of the lateral acceleration deviation ΔGy for causing the yawing moment in the direction opposite to the turning direction, to only the front-right wheel FR corresponding to the outside front wheel in the turning direction in case where the vehicle turns in the counterclockwise direction seen from the top of the vehicle.

Further, when the CPU 61 moves to the step 645 (i.e., when the vehicle is turning in the clockwise direction seen from the top of the vehicle), it sets a value obtained by multiplying together the coefficient Kf and the control volume G as the target slip ratio Stfl of the front-left wheel FL as well as set all the target slip ratios Sffr, Strl and Strr of the other wheels FR, RL and RR to "0". Then, the CPU 61 proceeds to the step 695 to temporarily terminate this routine. This process allows to set the target slip ratio, corresponding to the absolute value of the lateral acceleration deviation ΔGy for causing the yawing moment in the direction opposite to the turning direction, to only the front-left wheel FL corresponding to the outside front wheel in the turning direction in case where the vehicle turns in the clockwise direction seen from the top of the vehicle.

Subsequently explained is the calculation of the target slip ratio of each wheel required to determine the braking force that should be exerted on each wheel upon executing only the above-mentioned roll-over preventing control. The CPU 61 repeatedly executes a routine shown in FIG. 7 once every predetermined period. Accordingly, the CPU 61 starts the process from a step 700 at a predetermined timing, and then proceeds to a step 705 to determine whether the value of the actual lateral acceleration Gy detected by the lateral acceleration sensor 54 is not less than the roll-over preventing control starting reference value Gyth or not. If the CPU 61 makes "NO" determination, it immediately proceeds to a step 795 to temporarily terminate this routine. In this case, the roll-over preventing control is not executed (the OS-US restraining control can be executed).

The explanation is continued here assuming that the absolute value of the actual lateral acceleration Gy is not less than the roll-over preventing control starting reference value Gyth. The CPU 61 makes "YES" determination at the step 705, and then, proceeds to the step 710 to calculate a control volume Gr according to the magnitude of the inner-wheel braking force that should be exerted on the vehicle with the roll-over preventing control and the control volume Gf according to the magnitude of the outer-wheel braking force, based upon the absolute value of the actual lateral acceleration Gy detected by the lateral acceleration sensor 54 and the table described in the step 710 and corresponds to each graph shown in FIG. 3.

As shown in the table described in the step 710, the control volume Gr is the value corresponding to the graph in FIG. 3(b). It increases from "0" with a predetermined slope until it reaches a positive constant value G2, as the absolute value of the actual lateral acceleration Gy increases from the rear-wheel-side reference value Gyr. After the control volume Gr reaches the positive constant value G2, it is set so as to keep the positive constant value G2 even if the absolute value of the actual lateral acceleration Gy increases. Further, the control volume Gf is the value corresponding to the graph in FIG. 3(a). It increases from "0" with a predetermined slope until it reaches a positive constant value G3, as the absolute value of the actual lateral acceleration Gy increases from the rear-wheel-side reference value Gyr. After the control volume Gf reaches the positive constant value G3, it is set so as to keep the positive constant value G3 even if the absolute value of the actual lateral acceleration Gy increases. It should be noted that the positive constant value G2 is determined based upon the specification of the suspension (of the rear wheels, in particular).

Then, the CPU 61 moves to a step 715 to judge whether the value of the turning direction indicating flag L is "1" or not. When it makes "YES" determination at the step 715 (in case where the vehicle is turning in the counterclockwise direction seen from the top of the vehicle), the CPU 61 proceeds to a step 720 to set a value obtained by multiplying together the coefficient Kf and the control volume Gf calculated at the step 710 as the target slip ratio Stfr of the front-right wheel FR, set a value obtained by multiplying together the coefficient Kr and the control volume Gr as the target slip ratio Strl of the rear-left wheel RL and set the other target slip ratios Stfl and Strr of the other wheels FL and RR to "0". Then, the CPU 61 proceeds to a step 795 to temporarily terminate this routine. This process allows to set the target slip ratio, corresponding to the absolute value of the actual lateral acceleration Gy for causing the height lowering force, to the rear-left wheel RL that is the inside rear wheel of the turning direction, as well as to set the target slip ratio, corresponding to the absolute value of the actual lateral acceleration Gy for causing the yawing moment in the direction opposite to the turning direction, to the front-right wheel FR that is the outside front wheel in the turning direction, in case where the vehicle turns in the counterclockwise direction seen from the top of the vehicle.

On the other hand, the turning direction indicating flag L is "0" at the judgement of the step 715, the CPU 61 makes "NO" determination at the step 715, and then, proceeds to a step 725 to set a value obtained by multiplying together the coefficient Kf and the control volume Gf calculated at the step 710 as the target slip ratio Stfl of the front-left wheel FL, set a value obtained by multiplying together the coefficient Kr and the control volume Gr as the target slip ratio Strr of the rear-right wheel RR and set the other target slip ratios Stfr and Strl of the other wheels FR and RL to "0". Then, the CPU 61 proceeds to a step 795 to temporarily terminate this routine. This process allows to set the target slip ratio, corresponding to the absolute value of the actual lateral acceleration Gy for causing the height lowering force, to the rear-right wheel RR that is the inside rear wheel of the turning direction, as well as to set the target slip ratio, corresponding to the absolute value of the actual lateral acceleration Gy for causing the yawing moment in the direction opposite to the turning direction, to the front-left wheel FL that is the outside front wheel in the turning direction, in case where the vehicle turns in the clockwise direction seen from the top of the vehicle. As described above, the target slip ratio of each wheel required to determine the braking force that should be exerted on each wheel upon executing only the roll-over preventing control is determined.

Subsequently explained is a setting of a control mode of the vehicle. The CPU 61 repeatedly executes a routine shown in FIG. 8 once every predetermined period. Accordingly, the CPU 61 starts the process from a step 800 at a predetermined timing, and then proceeds to a step 805 to determine whether the anti-skid control is necessary or not at the present. The anti-skid control is a control, when a specific wheel is locked with the brake pedal BP operated, for decreasing the braking force of the specific wheel. The detail of the anti-skid control is well-known, so that the detailed explanation thereof is omitted here.

Specifically, at the step 805, the CPU 61 judges that the anti-skid control is necessary in case where the state that the brake pedal BP is operated is shown by the brake switch 55 and the value of the actual slip ratio Sa of the specific wheel calculated at the step 415 in FIG. 4** is not less than the positive predetermined value.

When the anti-skid control is judged to be necessary at the judgement of the step 805, the CPU 61 moves to a step 810 to set "1" to a variable Mode for setting a control mode that simultaneously executes the stability control upon turning and the anti-skid control, and then, proceeds to the following step 850.

On the other hand, when the anti-skid control is judged to be unnecessary at the judgement of the step 805, the CPU 61 moves to a step 815 to determine whether the front-rear braking force distribution control is required or not at present. The front-rear braking force distribution control is a control for decreasing a ratio (distribution) of the braking force of rear wheels to the braking force of front wheels in accordance with a magnitude of a deceleration in the front-rear direction of the vehicle with the brake pedal BP operated. The detail of the front-rear braking force distribution control is well-known, so that the detailed explanation thereof is omitted here.

Specifically, the CPU 61 judges at the step 815 that the front-rear braking force distribution control is needed, in case where the brake switch 55 shows that the brake pedal BP is operated and the case where the estimated body speed DVso calculated at the step 420 of FIG. 4 is a negative value and its absolute value is not less than the predetermined value.

When the front-rear braking force distribution control is needed in the judgement at the step 815, the CPU 61 proceeds to a step 820 where "2" is set to a variable Mode for setting a control mode for executing both the stability control upon turning and the front-rear braking force distribution control. Then, the CPU 61 proceeds to the next step 850.

When the front-rear braking force distribution control is not needed in the judgement at the step 815, the CPU 61 proceeds to a step 825 for determining whether the traction control is needed or not at present. The traction control is a control for increasing the braking force of the specific wheel or decreasing the driving force of the engine 31 in case where the specific wheel is spun in the direction where the driving force of the engine 31 is generated with the brake pedal BP not operated. The detail of the traction control is well-known, so that the detailed explanation thereof is omitted here.

Specifically, the CPU 61 judges at the step 825 that the traction control is needed, in case where the brake switch 55 shows that the brake pedal BP is not operated and the case where the actual slip ratio Sa of the specific wheel calculated at the step 415 of FIG. 4** is a negative value and its absolute value is not less than the predetermined value.

When the traction control is needed in the judgement at the step 825, the CPU 61 proceeds to a step 830 where "3" is set to a variable Mode for setting a control mode that executes both the stability control upon turning and the traction control. Then, the CPU 61 proceeds to the next step 850.

When the traction control is not needed in the judgement at the step 825, the CPU 61 proceeds to a step 835 for determining whether the stability control upon turning is needed or not at present. Specifically, the CPU 61 determines that the stability control upon turning is needed at the step 835 in case where the absolute value of the actual lateral acceleration Gy detected by the lateral acceleration sensor 54 is less than the roll-over preventing control starting reference value Gyth and the absolute value of the lateral acceleration deviation ΔGy calculated at the step 510 in FIG. 5 is not less than the value Gy1, as well as in case where the absolute value of the actual lateral acceleration Gy detected by the lateral acceleration sensor 54 is not less than the roll-over preventing control starting reference value Gyth (i.e., in case where the roll-over preventing control is executed), since there exists the specific wheel wherein the value of the target slip ratio St set by the routine in FIG. 6 or FIG. 7** is not "0".

When the stability control upon turning is needed in the judgement at the step 835, the CPU 61 proceeds to a step 840 where "4" is set to a variable Mode for setting a control mode executing only the stability control upon turning (actually, either one of the OS-US restraining control and the roll-over preventing control). Then, the CPU 61 proceeds to the next step 850. On the other hand, when it is determined that the stability control upon turning is not needed in the judgement of the step 835, the CPU 61 proceeds to a step 845 where "5" is set to a variable Mode for setting a non-control mode wherein the vehicle motion control is not executed, and then, proceeds to the next step 850. In this case, the specific wheel that should be controlled is not present.

When the CPU 61 proceeds to the step 850, it sets "1" to a flag CONT corresponding to a wheel to be controlled, while sets "0" to a flag CONT corresponding to a wheel not to be controlled, that is not the wheel to be controlled. The wheel to be controlled at this step 850 is a wheel that is required to control at least one of the corresponding pressure increasing valve PU and the pressure decreasing valve PD shown in FIG. 2.

Figure 6:
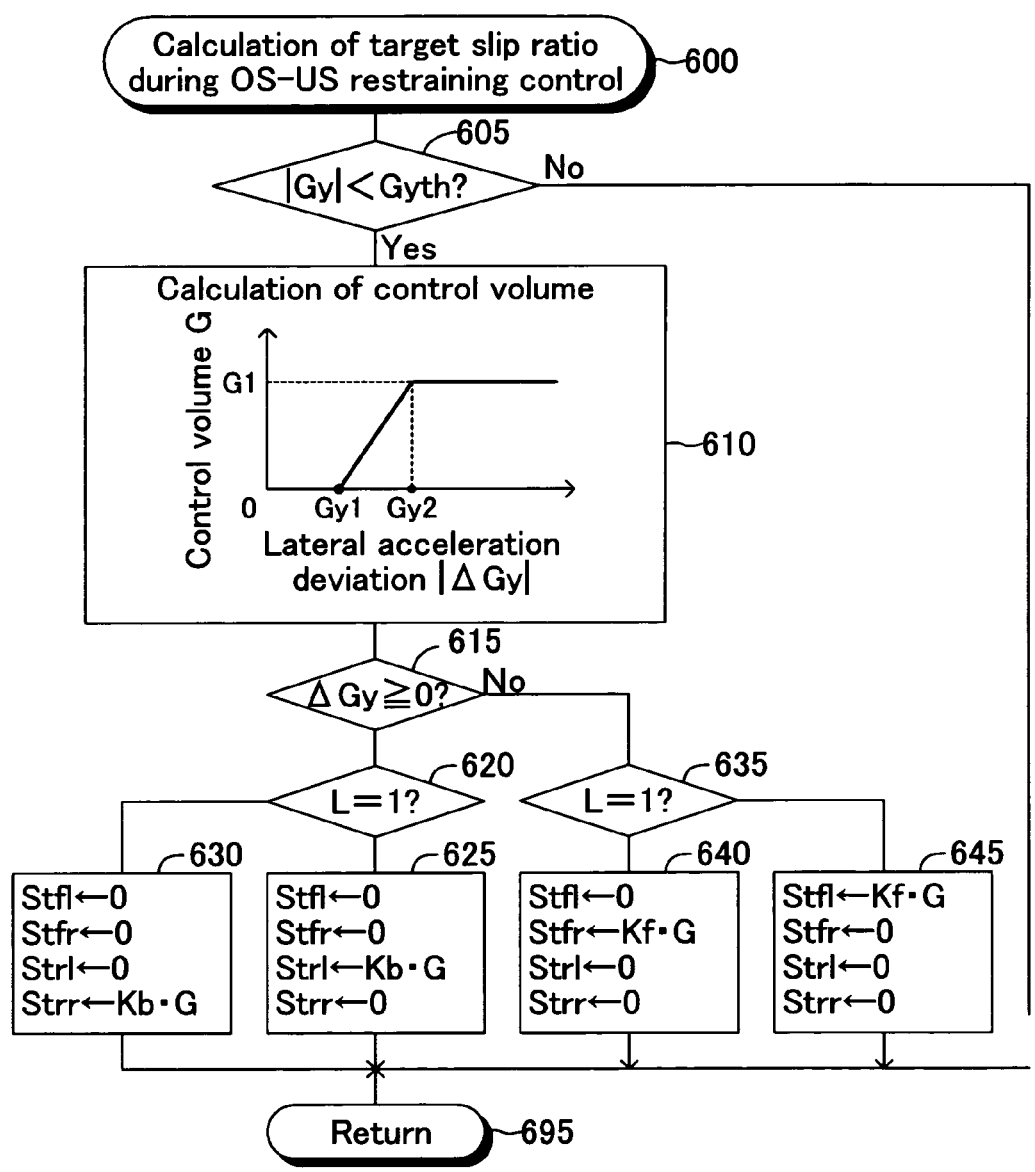
FIG. 6 is a flowchart executed by the CPU shown in FIG. 1 for calculating a target slip ratio during an OS-US restraining control.

Accordingly, in case where only the brake fluid pressure in the wheel cylinder Wfr of the front-right wheel FR is required to be increased, such as the case where the brake pedal BP is not operated and the program proceeds to the step 640 in FIG. 6, for example, the control valve SA1, change-over valve STR and pressure increasing valve PUfl shown in FIG. 2 are switched over to the second position and the pressure increasing valve PUfr and the pressure decreasing valve PDfr are respectively controlled, whereby only the brake fluid pressure in the wheel cylinder Wfr is increased by utilizing the high pressure generated from the high-pressure generating section 41 while keeping the brake fluid pressure in the wheel cylinder Wfl to be the fluid pressure at this time. Therefore, not only the front-right wheel FR but also the front-left wheel FL are included in the wheels to be controlled in this case. After executing the step 850, the CPU 61 proceeds to a step 895 for temporarily terminating this routine. As described above, the control mode is specified and the wheel to be controlled is specified.

Subsequently explained is the control of the braking force that should be exerted on each driving wheel. The CPU 61 repeatedly executes the routine shown in FIG. 9 once every predetermined period. Accordingly, the CPU 61 starts the process from a step 900 at a predetermined timing, and then, proceeds to a step 905 to determine whether the variable Mode is "0" or not. If the variable Mode is "0" here, the CPU 61 makes "NO" determination at the step 905, and then, proceeds to a step 910 for turning off (non-actuated state) all electromagnetic solenoids in the brake hydraulic control device 40 since the brake control is not required to be executed to each wheel. Thereafter, the CPU 61 moves to a step 995 to temporarily terminate this routine. This allows to supply to each wheel cylinder W** brake fluid pressure according to the operating force of the brake pedal BP by the driver.

On the other hand, if the variable Mode is not "0" in the judgement at the step 905, the CPU 61 makes "Yes" determination at the step 905, and proceeds to a step 915 for determining whether the variable Mode is "4" or not. If the variable Mode is not "4" (i.e., if the anti-skid control or the like that is other than the stability control upon turning is needed), the CPU 61 makes "NO" determination at the step 915, and then, proceeds to a step 920 for correcting the target slip ratio St of each wheel that is required upon executing only the stability control upon turning already set in FIG. 6 or FIG. 7, with respect to the wheel to be controlled wherein the value of the flag CONT is set to "1" at the step 850 in FIG. 8. Then, the CPU 61 moves to a step 925. By this process, the target slip ratio St of each wheel already set in FIG. 6 or FIG. 7** is corrected, every wheel to be controlled, by the target slip ratio of each wheel required for executing the control that is simultaneously executed with the stability control upon turning and corresponds to the value of the variable Mode.

Figure 7:
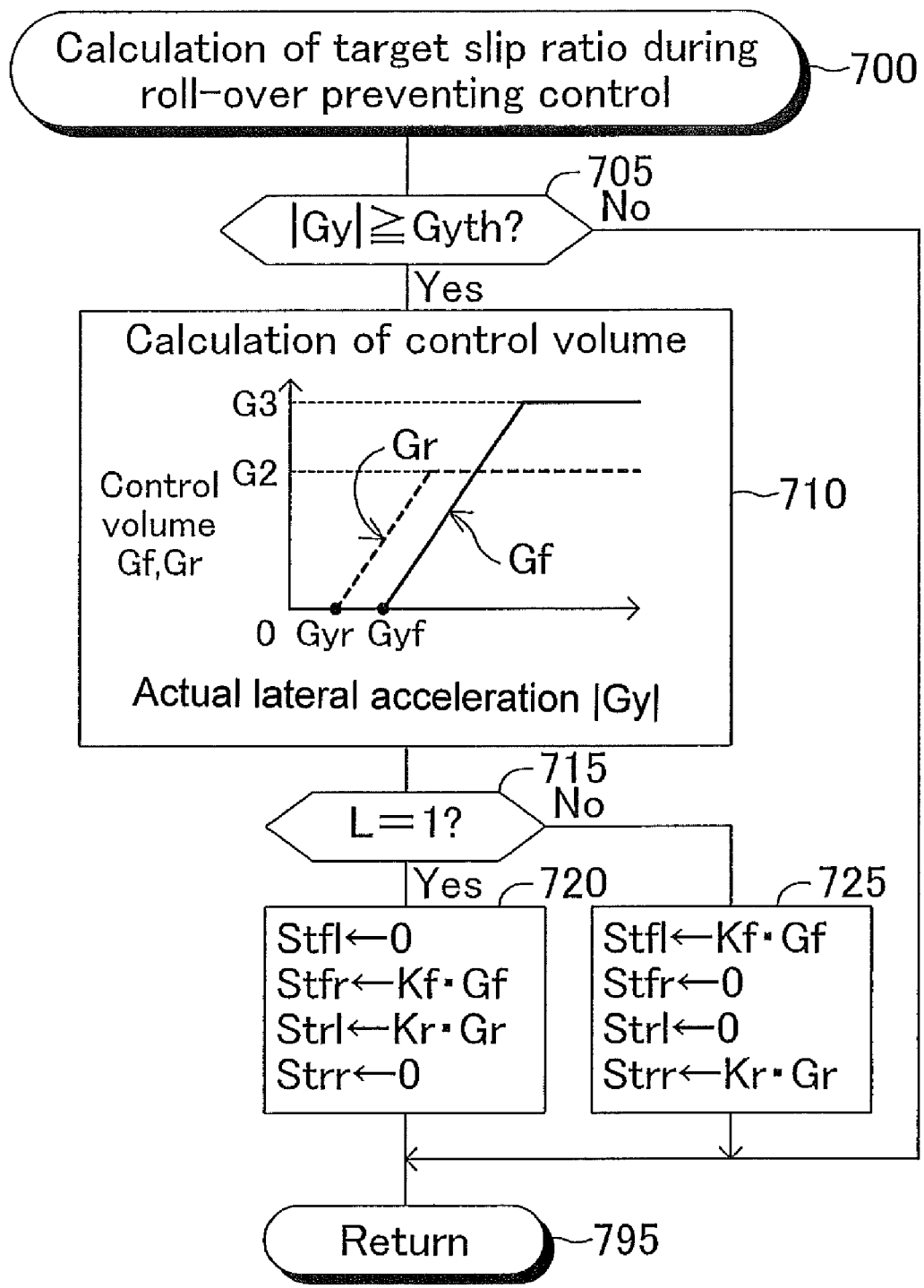
FIG. 7 is a flowchart executed by the CPU shown in FIG. 1 for calculating a target slip ratio during the roll-over preventing control.

If the variable Mode is "4" in the judgement at the step 915, the CPU 61 makes "YES" determination at the step 915, and directly moves to the step 925, since it is unnecessary to correct the target slip ratio St of each wheel already set in FIG. 6 or FIG. 7. Moving to the step 925, the CPU 61 calculates a slip ratio deviation ΔSt every wheel to be controlled based upon the value of the target slip ratio St, the value of the actual slip ratio Sa calculated at the step 415 in FIG. 4 and the formula disclosed in the step 925, with respect to the wheel to be controlled wherein the value of the flag CONT is set to "1" at the step 850 in FIG. 8**.

Then, the CPU 61 proceeds to a step 930 for setting a hydraulic control mode with respect to the wheel to be controlled every wheel to be controlled. Specifically, every wheel to be controlled, the CPU 61 sets the hydraulic control mode to "pressure-up" when the value of the slip ratio deviation ΔSt exceeds the predetermined positive reference value, sets the hydraulic control mode to "keep" when the value of the slip ratio deviation ΔSt is not less than the predetermined negative reference value but not more than the predetermined positive reference value, and sets the hydraulic control mode to "pressure-down" when the value of the slip ratio deviation ΔSt is less than the predetermined negative reference value, based upon the value of the slip ratio deviation ΔSt calculated at the step 925 every wheel to be controlled and the table disclosed in the step 930.

Subsequently, the CPU 61 proceeds to a step 935 where it controls the control valves SA1 and SA2 and the change-over valve STR shown in FIG. 2 based upon the hydraulic control mode set at the step 930 every wheel to be controlled and further it controls the pressure increasing valve PU and pressure reducing valve PD according to the hydraulic control mode every wheel to be controlled.

Specifically, the CPU 61 controls to set the corresponding pressure increasing valve PU and pressure reducing valve PD to the first position (position in the non-actuated state) with respect to the wheel to be controlled having the hydraulic control mode of "pressure-up", while it controls to set the corresponding pressure increasing valve PU to the second position (position in the actuated state) and the corresponding pressure reducing valve PD to the first position with respect to the wheel to be controlled having the hydraulic control mode of "keep", and further it controls to set the corresponding pressure increasing valve PU and pressure reducing valve PD to the second position (position in the actuated state) with respect to the wheel to be controlled having the hydraulic control mode of "pressure-down".

This operation causes to increase the brake fluid pressure in the wheel cylinder W of the wheel to be controlled having the hydraulic control mode of "pressure-up", while to decrease the brake fluid pressure in the wheel cylinder W of the wheel to be controlled having the hydraulic control mode of "pressure-down", whereby each wheel to be controlled is controlled such that the actual slip ratio Sa of each wheel to be controlled approaches to the target slip ratio St. Consequently, the control corresponding to the control mode set in FIG. 8 can be achieved.

Figure 8:
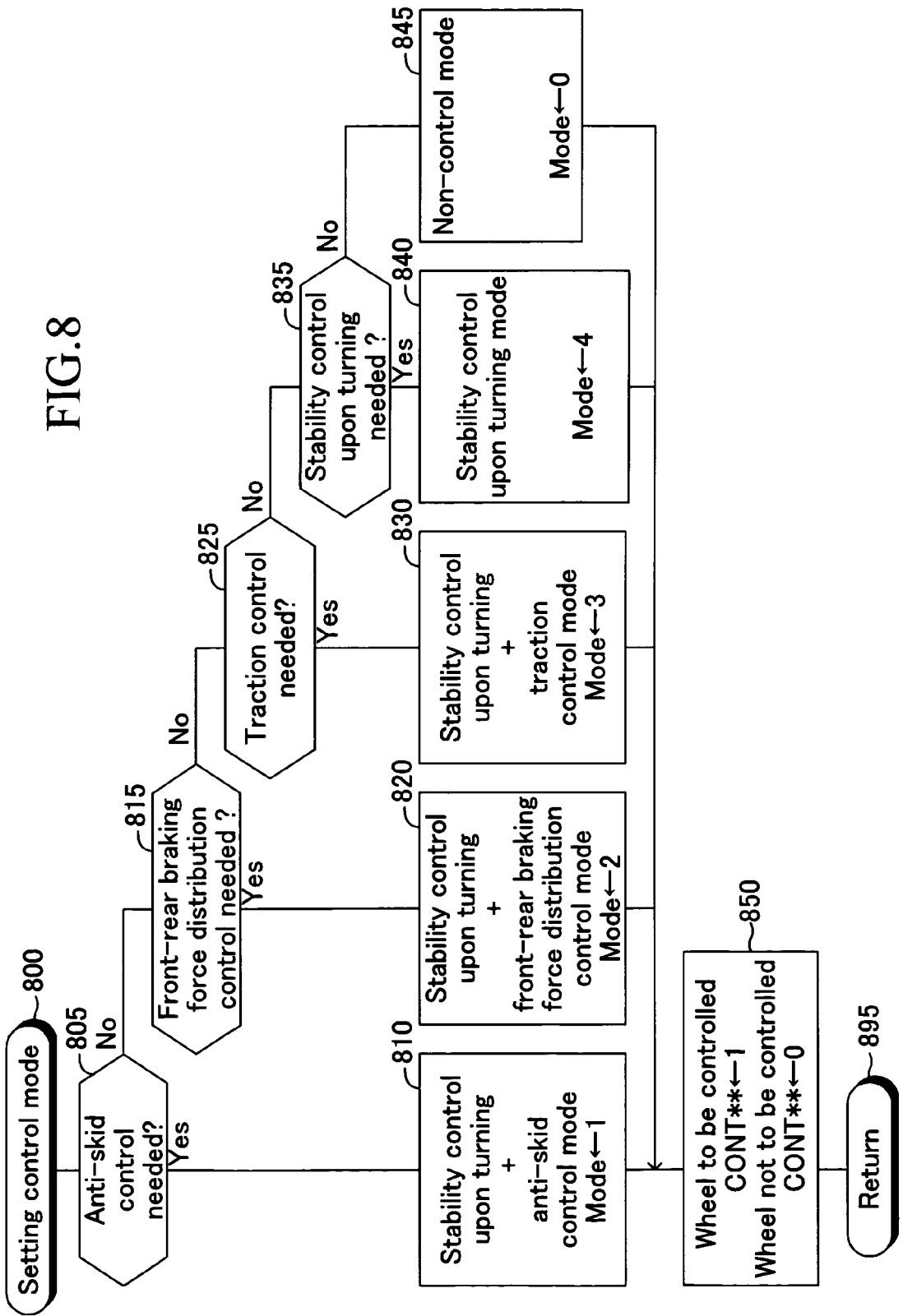
FIG. 8 is a flowchart showing a routine executed by the CPU shown in FIG. 1 for setting a control mode.
Figure 9:
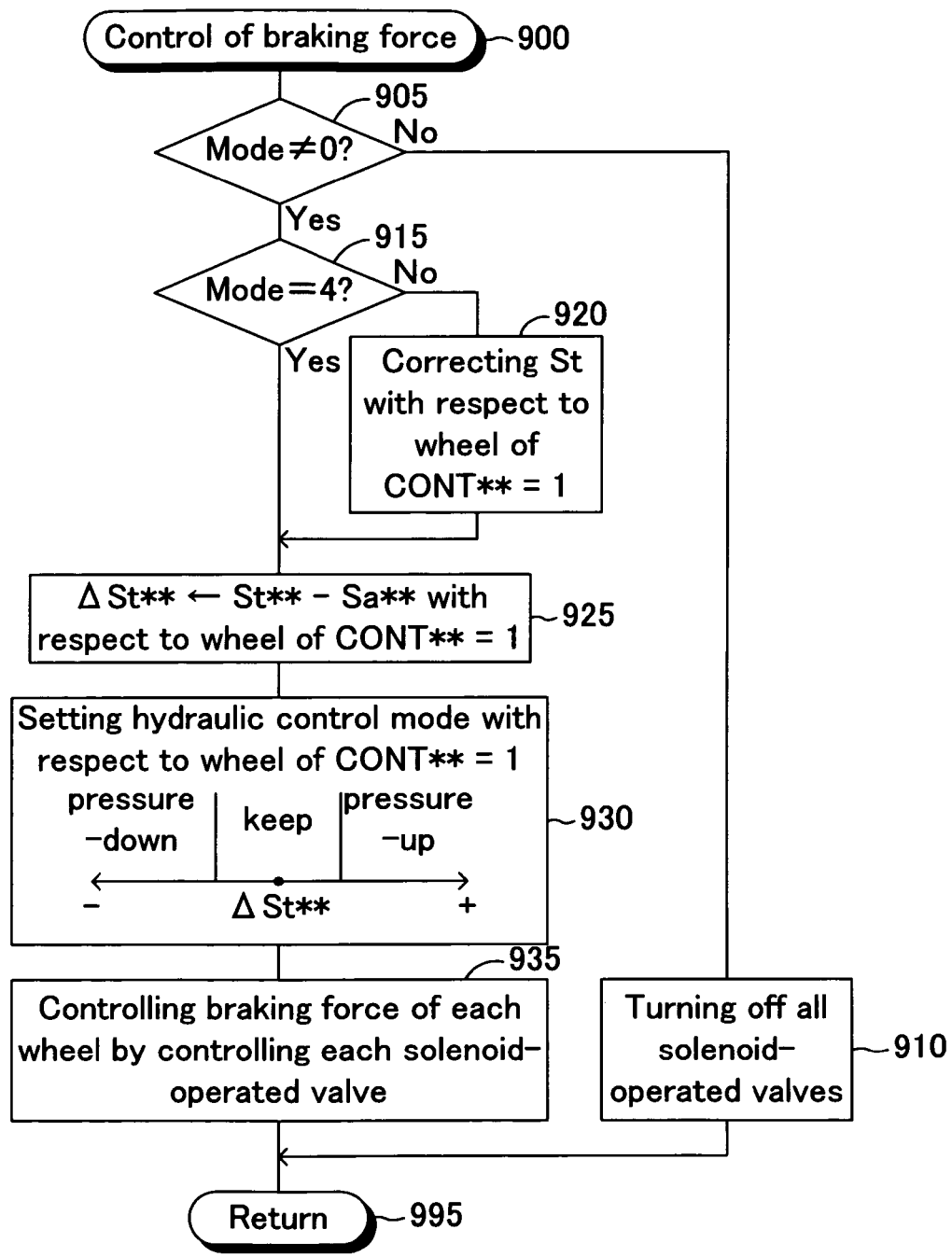
FIG. 9 is a flowchart showing a routine executed by the CPU shown in FIG. 1 for controlling braking force exerted on each wheel.

It is to be noted that, when the control mode set by the execution of the routine of FIG. 8 is the control mode (variable Mode=3) for executing the traction control mode or the control mode (variable Mode=4) for executing only the stability control upon turning, the CPU 61 controls, according to need, the throttle valve actuator 32 such that the opening of the throttle valve TH becomes smaller than the opening according to the operating amount Accp of the accelerator pedal AP by a predetermined amount for reducing driving force from the engine 31. Then, the CPU 61 proceeds to a step 995 for temporarily terminating this routine.

As explained above, the vehicle motion control device of the present invention causes the inner-wheel braking force, according to the value of the actual lateral acceleration Gy, only on the rear wheel at the inner side of the turning direction when the absolute value of the actual lateral acceleration Gy is not less than the rear-wheel-side reference value Gyr and not more than the front-wheel-side reference value Gyf, in case where the absolute value of the actual lateral acceleration Gy becomes not less than the rear-wheel-side reference value Gyr in the roll-over preventing control. This inner-wheel braking force causes the aforesaid height lowering force at the vehicle rear-side section of the inner side of the turning direction, thereby being capable of preventing that the height of the vehicle rear-side section of the inner side of the turning direction increases (i.e., being capable of keeping the lowered height). Therefore, the increase in the roll angle caused on the vehicle body is restrained.

In addition, when the absolute value of the actual lateral acceleration Gy becomes not less than the front-wheel-side reference value Gyf, the inner-wheel braking force according to the absolute value of the actual lateral acceleration Gy is caused on the rear wheel at the inner side of the turning direction and the outer-wheel braking force according to the absolute value of the actual lateral acceleration Gy is also caused on the front wheel at the outer side of the turning direction. By this outer-wheel braking force, a yawing moment is forcibly generated on the vehicle in the direction opposite to the turning direction. As a result, the absolute value of the actual lateral acceleration Gy is decreased, thereby controlling the increase in the roll angle caused on the vehicle body.

Further, during the increase in the absolute value of the actual lateral acceleration Gy, the outer-wheel braking force is started to be exerted after the inner-wheel braking force is started to be exerted. Therefore, the outer-wheel braking force is started to be exerted while surely preventing that the vehicle height of the inner side of the turning direction increases, so that the occurrence of excessive roll angle is more assuredly prevented.

The present invention is not limited to the above-mentioned embodiments. Various modifications can be applied within the scope of the present invention. For example, although the slip ratio of each wheel is used as a control target for controlling the braking force exerted on each wheel of the vehicle in the above-mentioned embodiment, any physical quantity such as brake fluid pressure in the wheel cylinder W** of each wheel may be used as a control target, so long as it is physical quantity that changes according to the braking force exerted on each wheel.

Moreover, although the maximum value G1 of the control volume G calculated at the step 610 in FIG. 6 and the maximum value G3 of the control volume Gf calculated at the step 710 in FIG. 7 are different from each other in the above-mentioned embodiment, the maximum value G1 of the control volume G and the maximum value G3 of the control volume Gf may be the same.

Further, although it is configured in the above-mentioned embodiment that the braking force is exerted, as the inner-wheel braking force, on only the rear wheel at the inner side of the turning direction during the roll-over preventing control, it may be configured such that the braking force is exerted, as the inner-wheel braking force, on the front and rear wheels at the inner side of the turning direction. Similarly, although it is configured in the above-mentioned embodiment that the braking force is exerted, as the outer-wheel braking force, on only the front wheel at the outer side of the turning direction during the roll-over preventing control, it may be configured such that the braking force is exerted, as the outer-wheel braking force, on the front and rear wheels at the outer side of the turning direction.

Moreover, in the above-mentioned embodiment, the control volumes Gf and Gr during the roll-over preventing control are determined according to the absolute value of the actual lateral acceleration Gy that is indicated by the output value of the lateral acceleration sensor 54 and serves as the excessive roll angle occurrence tendency index value, as shown in the step 710 in FIG. 7. However, the control volumes Gf and Gr during the roll-over preventing control may be determined according to an absolute value of a roll angle θroll caused on the vehicle body.

A specific process in this case will be explained. The CPU 61 repeatedly executes the routine for calculating the roll angle θroll shown in FIG. 10 once every predetermined period. Accordingly, the CPU 61 starts the process from a step 1000 at a predetermined timing, and then, proceeds to a step 1005 to calculate a vehicle height difference ΔH between the left-side vehicle body and the right-side vehicle body based upon each value of the height Hfl, Hfr, Hrl and Hrr of each wheel section obtained by the height sensors 56fl, 56fr, 56rl and 56rr and the formula disclosed in the step 1005.

The vehicle height difference ΔH means here an average value of the vehicle height difference between the front-left vehicle body and the front-right vehicle body and the vehicle height difference between the rear-left vehicle body and the rear-right vehicle body. Further, the height difference ΔH is set to take a positive value when the height at the left-side vehicle body is greater than the height at the right-side vehicle body, i.e., when the vehicle is turning in the counterclockwise direction (seen from the top of the vehicle), while it is set to take a negative value when the height at the left-side vehicle body is smaller than the height at the right-side vehicle body, i.e., when the vehicle is turning in the clockwise direction (seen from the top of the vehicle).

Subsequently, the CPU 61 proceeds to a step 1010 to calculate the roll angle θroll of the vehicle body based upon the value of the height difference ΔH, the value of the wheel tread T that is a distance between the center lines in the side-to-side direction of the vehicle body on the contact surface of the tire tread of the left and right wheels (e.g., rear-left and rear-right wheels RL, RR) with the road surface and the formula disclosed in the step 1010. Thereafter, the CPU 61 moves to a step 1095 to temporarily terminate this routine. As apparent from the formula disclosed in the step 1010, the sign of the roll angle θroll is the same as the sign of the vehicle height difference ΔH, whereby the roll angle θroll is set to take a positive value when the vehicle is turning in the counterclockwise direction (seen from the top of the vehicle), while it is set to take a negative value when the vehicle is turning in the clockwise direction (seen from the top of the vehicle).

Figure 10:
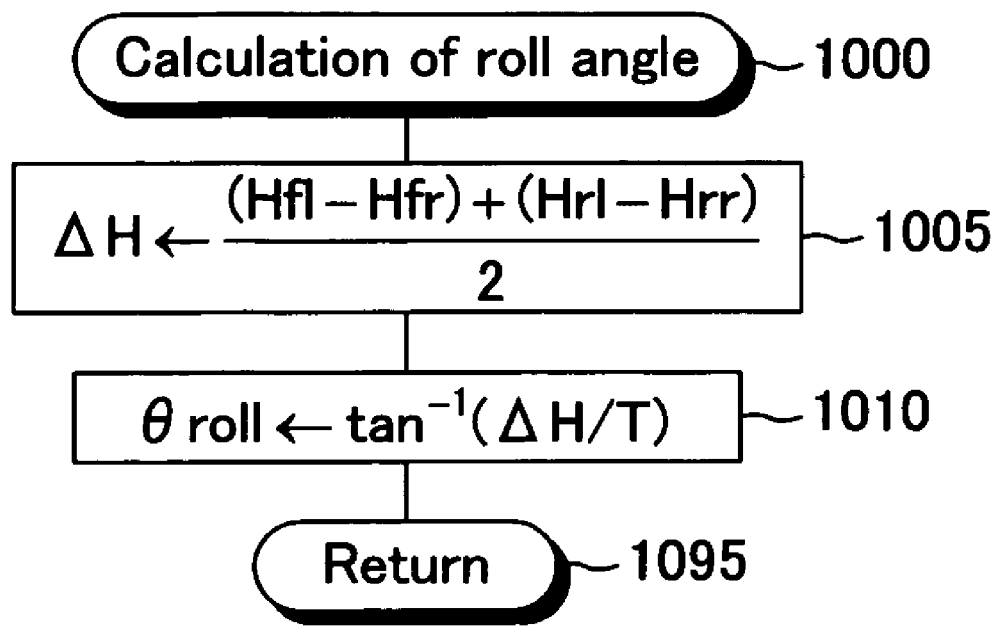
FIG. 10 is a flowchart showing a routine executed by a CPU in a vehicle motion control device according to a modified example of the embodiment shown in FIG. 1 for calculating a roll angle.

Then, the CPU 61 takes, instead of the absolute value of the actual lateral acceleration Gy, the absolute value of the roll angle θroll calculated at the step 1010 in FIG. 10 as the horizontal axis of the table disclosed in the step 710 in FIG. 7 and takes the corresponding value θrollf and the corresponding value θrollr instead of the front-wheel-side reference value Gyf and the rear-wheel-side reference value Gyr, thereby calculating the control volumes Gf and Gr. As described above, the control volumes Gf and Gr (accordingly, the outer-wheel braking force and the inner-wheel braking force) during the roll-over preventing control are changed according to the absolute value of the roll angle θroll caused on the vehicle body. Further, the control volumes Gf and Gr during the roll-over preventing control calculated at the step 710 in FIG. 7 may be determined according to the absolute value of a roll angle speed θ'roll by using the roll angle speed θ'roll, that is a time derivative value of the calculated roll angle θroll, as the excessive roll angle occurrence tendency index value.

Further, it may be configured such that the control volumes Gf and Gr calculated at the step 710 in FIG. 7 are changed according to the absolute value of the actual yaw rate caused on the vehicle body and detected by a yaw rate sensor not shown. Moreover, it may be configured such that the control volumes Gf and Gr calculated at the step 710 in FIG. 7 are changed according to the absolute value of the steering angle θs (steering operation amount) obtained by the steering angle sensor 52 as the excessive roll angle occurrence tendency index value. Further, it may be configured such that the control volumes Gf and Gr calculated at the step 710 in FIG. 7 are changed according to the absolute value of the revolution speed (operation speed of the steering) of the steering 21 as the excessive roll angle occurrence tendency index value. In this case, the steering revolution speed θ's is calculated by the following formula (4).

$$\theta's = (\theta s - \theta s1)/\Delta t \quad (4)$$

In the formula (4), θs1 is the previous steering angle obtained by the steering angle sensor 52 during the execution of the processing at the step 505 in FIG. 5 and Δt is the predetermined time that is the operation period of each routine.

Moreover, the "excessive roll angle occurrence tendency index value" may be a total sum of the absolute value of the actual lateral acceleration Gy, absolute value of the yaw rate, absolute value of the roll angle θroll, roll angle speed θ'roll, steering angle θs and steering revolution speed θ's or may be a total sum of the values obtained by multiplying each absolute value by each predetermined coefficient (the weight values). Further, the one of each absolute values that exceeds the reference value corresponding to the roll-over preventing control starting reference value Gyth (in case where there are plural values that exceed the corresponding reference value among each absolute value, the one having the greatest degree of deviation from the corresponding reference value) may be adopted as the "excessive roll angle occurrence tendency index value".

What is claimed is:

1. A vehicle motion control device comprising:
   index obtaining means for obtaining an index value that indicates a degree of tendency that an excessive roll angle occurs on a vehicle; and
   braking force controlling means for exerting a first braking force only on a wheel at the inner side of a turning direction when the vehicle is in a turning state and the index value is equal to or greater than a first predetermined value and less than a second predetermined value, which first braking force itself prevents an increase in a height of a vehicle body at a section above said wheel at the inner side of the turning direction, the braking force controlling means changing the value of the first braking force according to the index value,
   wherein when the index value is equal to or greater than the second predetermined value, which is greater than the first predetermined value, during the turning state of the vehicle, the braking force controlling means exerts the first braking force on said wheel at the inner side of the turning direction and also exerts a second braking force on one of the wheels at the outer side of the turning direction to produce a yawing moment in a direction opposite the turning direction.

2. A vehicle motion control device claimed in claim 1, wherein the braking force controlling means is configured to give the first braking force on a rear wheel at the inner side of the turning direction.

3. A vehicle motion control device claimed in claim 1, wherein the braking force controlling means is configured to give the second braking force on a front wheel at the outer side of the turning direction.

4. A vehicle motion control device claimed in claim 3, wherein the braking force controlling means is configured to change the value of the second braking force according to the index value.

5. A vehicle motion control device claimed in claim 1, wherein the index obtaining means is configured to obtain a value, as the index value, based upon at least one of a lateral acceleration that is a component of an acceleration exerted on the vehicle in a side-to-side direction of the vehicle body, a yaw rate exerted on the vehicle, a roll angle caused on the vehicle, a roll angle speed that is the rate of change with time of the roll angle, an operation amount of a steering that changes a turning angle of a steering wheel of the vehicle and an operation speed of the steering.

6. A vehicle motion control device operable in a vehicle in a turning state in which two wheels are at an inner side of a turning direction and two wheels are at an outer side of the turning direction, comprising:
   index obtaining means for obtaining an index value that indicates a degree of tendency that an excessive roll angle occurs on a vehicle;
   braking force controlling means for exerting a first braking force only on one of the two wheels at the inner side of the turning direction when the vehicle is in the turning state and the index value is equal to or greater than a first predetermined value and less than a second predetermined value, which first braking force itself prevents an increase in a height of a vehicle body at a section above said wheel at the inner side of the turning direction;
   the braking force controlling means also exerting a second braking force on one of the two wheels at the outer side of the turning direction when the vehicle is in the turning state and the index value is equal to or greater than the second predetermined value, which second braking force is in addition to the first braking force, to produce a yawing moment in a direction opposite the turning direction;
   the braking force controlling means varying the first braking force according to a variation in the index value; and
   the braking force controlling means varying the second braking force according to a variation in the index value.

7. A vehicle motion control device claimed in claim 6, wherein the braking force controlling means is configured to give the first braking force on a rear wheel at the inner side of the turning direction.

8. A vehicle motion control device claimed in claim 6, wherein the braking force controlling means is configured to give the second braking force on a front wheel at the outer side of the turning direction.

9. A vehicle motion control device claimed in claim 6, wherein the index obtaining means is configured to obtain a value, as the index value, based upon at least one of a lateral acceleration that is a component of an acceleration exerted on the vehicle in a side-to-side direction of the vehicle body, a yaw rate exerted on the vehicle, a roll angle caused on the vehicle, a roll angle speed that is the rate of change with time of the roll angle, an operation amount of a steering that changes a turning angle of a steering wheel of the vehicle and an operation speed of the steering.

10. A vehicle motion control device claimed in claim 6, wherein the first predetermined value is greater than zero, and
    wherein the braking force controlling means increases the first braking force as the index value increases when the index value is equal to or greater than the first predetermined value and less than the second predetermined value, and increases the second braking force as the index value increases when the index value is equal to or greater than the second predetermined value.

11. A vehicle motion control device claimed in claim 10, wherein the braking force controlling means is configured to give the first braking force on a rear wheel at the inner side of the turning direction.

12. A vehicle motion control device claimed in claim 10, wherein the braking force controlling means is configured to give the second braking force on a front wheel at the outer side of the turning direction.

13. A vehicle motion control device claimed in claim 10, wherein the index obtaining means is configured to obtain a value, as the index value, based upon at least one of a lateral acceleration that is a component of an acceleration exerted on the vehicle in a side-to-side direction of the vehicle body, a yaw rate exerted on the vehicle, a roll angle caused on the vehicle, a roll angle speed that is the rate of change with time of the roll angle, an operation amount of a steering that changes a turning angle of a steering wheel of the vehicle and an operation speed of the steering.

14. A vehicle motion control device comprising:
   index obtaining means for obtaining an index value that indicates a degree of tendency that an excessive roll angle occurs on a vehicle; and
   braking force controlling means for exerting a first braking force only on a wheel at the inner side of a turning direction when the vehicle is in a turning state and the index value is equal to or greater than a first predetermined value and less than a second predetermined value, which first braking force itself prevents an increase in a height of a vehicle body at a section above said wheel at the inner side of the turning direction, the braking force controlling means changing the value of the first braking force according to the index value,
   wherein the braking force controlling means is configured to exert a second braking force on a front wheel at the outer side of the turning direction when the vehicle is in the turning state and the index value is equal to or greater than the second predetermined value that is greater than the first predetermined value.

15. A vehicle motion control device claimed in claim 14, wherein the braking force controlling means is configured to give the first braking force on a rear wheel at the inner side of the turning direction.

16. A vehicle motion control device claimed in claim 14, wherein the braking force controlling means is configured to change the value of the second braking force according to the index value.

17. A vehicle motion control device claimed in claim 14, wherein the index obtaining means is configured to obtain a value, as the index value, based upon at least one of a lateral acceleration that is a component of an acceleration exerted on the vehicle in a side-to-side direction of the vehicle body, a yaw rate exerted on the vehicle, a roll angle caused on the vehicle, a roll angle speed that is the rate of change with time of the roll angle, an operation amount of a steering that changes a turning angle of a steering wheel of the vehicle and an operation speed of the steering.

* * * * *